(12) United States Patent
Sethi et al.

(10) Patent No.: US 11,095,391 B2
(45) Date of Patent: Aug. 17, 2021

(54) SECURE WIFI COMMUNICATION

(71) Applicant: NXP USA, Inc., Austin, TX (US)

(72) Inventors: Ankit Sethi, Pune (IN); Sayak Roy, Kolkata (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/721,091

(22) Filed: Dec. 19, 2019

(65) Prior Publication Data

US 2020/0204287 A1    Jun. 25, 2020

Related U.S. Application Data

(60) Provisional application No. 62/781,854, filed on Dec. 19, 2018.

(51) Int. Cl.
| | |
|---|---|
| H04W 16/28 | (2009.01) |
| H04W 64/00 | (2009.01) |
| H04L 25/02 | (2006.01) |
| H04B 7/06 | (2006.01) |
| H04B 17/336 | (2015.01) |
| H04L 1/00 | (2006.01) |
| H04K 1/02 | (2006.01) |
| H04W 84/12 | (2009.01) |

(52) U.S. Cl.
CPC ............ *H04K 1/02* (2013.01); *H04B 7/0617* (2013.01); *H04B 7/0621* (2013.01); *H04B 17/336* (2015.01); *H04L 1/0003* (2013.01); *H04L 1/0009* (2013.01); *H04L 25/0202* (2013.01); *H04W 16/28* (2013.01); *H04W 64/00* (2013.01); *H04W 84/12* (2013.01)

(58) Field of Classification Search
CPC .. H04B 17/336; H04B 7/0617; H04B 7/0621; H04K 1/02; H04L 1/0003; H04L 1/0009; H04L 25/0202; H04W 16/28; H04W 64/00; H04W 84/12
USPC ....... 455/69, 522, 403, 500, 452.1; 370/329, 370/331, 336, 338, 350
See application file for complete search history.

(56) References Cited

U.S. PATENT DOCUMENTS

| | | | |
|---|---|---|---|
| 5,546,423 A * | 8/1996 | Sehier | H04K 1/02 375/141 |
| 6,590,884 B1 | 7/2003 | Panasik | |
| 7,599,332 B2 | 10/2009 | Zelst et al. | |
| 7,742,390 B2 | 6/2010 | Mujtaba | |
| 8,179,819 B2 | 5/2012 | Kim et al. | |
| 8,270,909 B2 | 9/2012 | Zhang et al. | |

(Continued)

OTHER PUBLICATIONS

Catreux et al. "Attainable Throughput of an Interference-Limited Multiple-Input Multiple-Output (MIMO) Cellular System," IEEE Trans. Communications, vol. 49, No. 8, pp. 479-493 (Aug. 2001).

(Continued)

*Primary Examiner* — Tan H Trinh

(57) ABSTRACT

A first communication device determines a first spatial direction for beamforming toward a second communication device, and determines a second spatial direction that is orthogonal to the first spatial direction. The first communication device wirelessly transmits the data to the second communication device while performing beamforming in the first spatial direction, and simultaneously wirelessly transmits noise while performing beamforming in the second spatial direction.

34 Claims, 9 Drawing Sheets

(56) References Cited

U.S. PATENT DOCUMENTS

| | | | |
|---|---|---|---|
| 8,619,907 | B2 | 12/2013 | Mujtaba et al. |
| 8,724,720 | B2 | 5/2014 | Srinivasa et al. |
| 8,838,034 | B2 | 9/2014 | Larsson |
| 9,060,264 | B2* | 6/2015 | Baek .................. H04W 12/1202 |
| 9,325,540 | B2 | 4/2016 | Zhang et al. |
| 9,491,647 | B2 | 11/2016 | Ding et al. |
| 9,629,169 | B2 | 4/2017 | Zhang et al. |
| 10,122,756 | B1* | 11/2018 | Kelly .................... H04L 9/0819 |
| 10,135,506 | B2* | 11/2018 | Hafez .................... H01Q 25/00 |
| 10,320,459 | B2 | 6/2019 | Zhang et al. |
| 2005/0058151 | A1 | 3/2005 | Yeh |
| 2006/0067426 | A1 | 3/2006 | Maltsev et al. |
| 2007/0207769 | A1* | 9/2007 | Hara ...................... H04B 17/24 455/403 |
| 2007/0217455 | A1 | 9/2007 | Haeusler |
| 2007/0232235 | A1 | 10/2007 | Li et al. |
| 2008/0144493 | A1 | 6/2008 | Yeh |
| 2008/0240208 | A1 | 10/2008 | Lou et al. |
| 2009/0080579 | A1 | 3/2009 | Fujii |
| 2009/0185629 | A1* | 7/2009 | Gossett .................. H04L 23/02 375/259 |
| 2009/0196163 | A1 | 8/2009 | Du |
| 2009/0233554 | A1 | 9/2009 | Cordeiro et al. |
| 2009/0296649 | A1 | 12/2009 | Yagi |
| 2010/0040033 | A1 | 2/2010 | Xhafa et al. |
| 2010/0046358 | A1 | 2/2010 | van Nee |
| 2010/0091675 | A1 | 4/2010 | Sawai |
| 2010/0118837 | A1 | 5/2010 | Bracha |
| 2010/0233963 | A1 | 9/2010 | Harada et al. |
| 2010/0265925 | A1* | 10/2010 | Liu .................... H04W 72/0446 370/336 |
| 2010/0278065 | A1 | 11/2010 | Sun et al. |
| 2010/0309834 | A1 | 12/2010 | Fischer et al. |
| 2010/0317420 | A1* | 12/2010 | Hoffberg ............... G07F 17/323 463/1 |
| 2011/0002219 | A1 | 1/2011 | Kim et al. |
| 2011/0110250 | A1 | 5/2011 | Jeon et al. |
| 2011/0158115 | A1 | 6/2011 | Sun et al. |
| 2011/0183602 | A1* | 7/2011 | Tietz ........................ H04K 3/43 455/1 |
| 2011/0188391 | A1 | 8/2011 | Sella et al. |
| 2011/0216758 | A1* | 9/2011 | Hoshihara ......... H04W 72/0446 370/350 |
| 2011/0223867 | A1 | 9/2011 | Chae et al. |
| 2011/0268217 | A1 | 11/2011 | Gormley et al. |
| 2011/0273334 | A1* | 11/2011 | Karr ...................... G01S 13/825 342/378 |
| 2011/0280226 | A1 | 11/2011 | Lennvall et al. |
| 2011/0294514 | A1 | 12/2011 | Kulkarni |
| 2011/0305156 | A1 | 12/2011 | Liu et al. |
| 2012/0028572 | A1 | 2/2012 | Lu et al. |
| 2012/0034874 | A1 | 2/2012 | Yiu et al. |
| 2012/0039196 | A1 | 2/2012 | Zhang |
| 2012/0087265 | A1 | 4/2012 | Tamaki et al. |
| 2012/0113918 | A1 | 5/2012 | Freda et al. |
| 2012/0149414 | A1 | 6/2012 | Krishnaswamy et al. |
| 2012/0263068 | A1 | 10/2012 | Morimoto et al. |
| 2013/0035128 | A1 | 2/2013 | Chan et al. |
| 2013/0053078 | A1 | 2/2013 | Barbieri et al. |
| 2013/0155931 | A1 | 6/2013 | Prajapati et al. |
| 2013/0273947 | A1* | 10/2013 | Baek .................. H04W 12/1202 455/500 |
| 2014/0086212 | A1* | 3/2014 | Katie ................. H04W 72/1205 370/331 |
| 2014/0233416 | A1 | 8/2014 | Black et al. |
| 2014/0241240 | A1 | 8/2014 | Kloper et al. |
| 2014/0256341 | A1 | 9/2014 | Nayeb Nazar et al. |
| 2014/0274088 | A1* | 9/2014 | Talwar ................ H04W 72/046 455/452.1 |
| 2014/0302884 | A1 | 10/2014 | Zhao et al. |
| 2014/0334473 | A1* | 11/2014 | Zhang .................. H04B 7/0617 370/338 |
| 2015/0117408 | A1* | 4/2015 | Kedalagudde .... H04W 36/0027 370/331 |
| 2015/0139116 | A1* | 5/2015 | Wang .................... H04B 7/0408 370/329 |
| 2015/0236763 | A1* | 8/2015 | Garrett ...................... H04B 7/12 375/267 |
| 2017/0359106 | A1* | 12/2017 | John Wilson ........ H04B 7/0408 |
| 2018/0007701 | A1* | 1/2018 | Adachi .................... H04B 1/16 |
| 2018/0278425 | A1* | 9/2018 | Xu ........................ H04W 52/42 |
| 2019/0215369 | A1* | 7/2019 | Pry ......................... H04L 67/12 |
| 2019/0229833 | A1* | 7/2019 | Ha ........................... H04K 1/02 |
| 2020/0021327 | A1* | 1/2020 | Ciccarelli .............. H04B 1/525 |
| 2020/0280585 | A1* | 9/2020 | Zheng .................. H04L 63/105 |
| 2020/0336210 | A1* | 10/2020 | Khatibzadeh ........ H04B 10/112 |

OTHER PUBLICATIONS

Abusubaih et al., "A Framework for Interference Mitigation in Multi-BSS 802.11 Wireless LANs," IEEE International Symposium on a World of Wireless, Mobile and Multimedia Neworks & Workshops, pp. 1-11 (Jun. 15, 2009).

Bejerano et al., "MiFi: A Framework for Fairness and QoS Assurance for Current IEEE 802.11 Networks with Multiple Access Points," IEEE/ACM Transactions on Networking, vol. 14, No. 4, pp. 849-862 (Aug. 2006).

Zheng et al., "Overlapping Impacts and Resource Coordination for High-Density Wireless Communication," International Conference on Computing and Communication Technologies, 8 pages (Jul. 13, 2009).

IEEE Std 802.11—REVmcTM/D8.0 (revision of IEEE Std. 802.11TM-2012) "Draft Standard for Information technology—Telecommunications and information exchange between systems—Local and metropolitan area networks—Specific equirements" Part 11: Wireless LAN Medium Access Control (MAC) and Physical Layer (PHY) Specifications, The Institute of Electrical and Electronics Engineers, Inc., 3774 pages (Aug. 2016).

IEEE P802.11axTM/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11axTM/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

Zhang et al., "EHT Technology Candidate Discussions," doc: IEEE 802.11-18/1161r0, The Institute of Electrical and Electronics Engineers, Inc., pp. 1-10 Jul. 8, 2018.

IEEE Std 802.11adTM/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band The Institute of Electrical and Electronics Engineers, Inc., pp. 1-679 (Jul. 2012).

\* cited by examiner

SECURE WIFI COMMUNICATION

CROSS REFERENCES TO RELATED APPLICATIONS

This application claims the benefit of U.S. Provisional Patent Application No. 62/781,854, entitled "Secure WiFi," filed on Dec. 19, 2018, which is hereby incorporated herein by reference in its entirety.

FIELD OF TECHNOLOGY

The present disclosure relates generally to wireless communication systems, and more particularly to secure communications in a wireless local area network (WLAN).

BACKGROUND

Because wireless local area networks (WLANs) involve over-the-air communication technology, communication in a WLAN is susceptible to third party interception (or "eavesdropping"). To protect against eavesdropping, the Institute for Electrical and Electronics Engineers (IEEE) 802.11 Standard specifies data encryption mechanisms to protect sensitive/privileged information. The data encryption mechanisms specified by IEEE 802.11 Standard involve the use of a secret key to encrypt and decrypt data. Such data encryption mechanisms make it impossible to decrypt the data in a practical amount of time without knowledge of the secret key.

Encryption-based security mechanisms have limitations, however. For example, the secret key may become compromised (e.g., during an authentication process between communication devices), allowing an eavesdropper to obtain the secret key and then easily decrypt data that is transmitted in the WLAN. Additionally, progress in advanced computing technologies (e.g., quantum computing) may make it possible in the near future for an eavesdropper to crack a secret key in a manageable amount of time.

SUMMARY

In an embodiment, a method for securely communicating in a wireless communication network includes: determining, at a first communication device, a first spatial direction for beamforming toward a second communication device; determining, at the first communication device, a second spatial direction that is orthogonal to the first spatial direction; wirelessly transmitting, by the first communication device, the data to the second communication device while performing beamforming in the first spatial direction; and simultaneously with wirelessly transmitting the data to the second communication device, wirelessly transmitting, by the first communication device, noise while performing beamforming in the second spatial direction.

In another embodiment, a first communication device for securely communicating in a wireless communication network comprises: a wireless network interface device comprising one or more integrated circuit (IC) devices. The one or more IC devices are configured to: determine a first spatial direction for beamforming toward a second communication device; determine a second spatial direction that is orthogonal to the first spatial direction; wirelessly transmit the data to the second communication device while performing beamforming in the first spatial direction; and simultaneously with wirelessly transmitting the data to the second communication device, wirelessly transmit noise while performing beamforming in the second spatial direction.

In yet another embodiment, a method for securely communicating in a wireless communication network includes: determining, at a first communication device, channel measurement information for a wireless communication channel between the first communication device and a second communication device; determining, at the first communication device, pseudorandom modifications to be made to be made to transmission symbols using the channel measurement information according to a rule known to the second communication device; modulating, at the first communication device, data to be transmitted to the second communication device to generate unmodified transmission symbols; modifying, at the first communication device, the unmodified transmission symbols using the pseudorandom modifications to generate modified transmission symbols; and wirelessly transmitting, by the first communication device, the modified transmission symbols to the second communication device.

In still another embodiment, a first communication device for securely communicating in a wireless communication network comprises: a wireless network interface device comprising one or more IC devices. The one or more IC devices are configured to: determine channel measurement information for a wireless communication channel between the first communication device and a second communication device; determine pseudorandom modifications to be made to be made to transmission symbols using the channel measurement information according to a rule known to the second communication device; modulate data to be transmitted to the second communication device to generate unmodified transmission symbols; modify the unmodified transmission symbols using the pseudorandom modifications to generate modified transmission symbols; and wirelessly transmit the modified transmission symbols to the second communication device.

DETAILED DESCRIPTION

In various embodiments described below, a wireless communication device in a wireless local area network (WLAN) beamforms data in a direction of a receiver, and simultaneously beamforms noise in directions orthogonal to the direction of the receiver. Beamforming data in the direction of the receiver reduces signal strength in other directions, thus making it harder for an eavesdropper to decode the transmission. Additionally, beamforming noise in directions orthogonal to the direction of the receiver makes decoding the transmission even harder for the eavesdropper, without degrading the reception of the data at the receiver. In some embodiments, the wireless communication device coordinates with other wireless communication devices so that the other wireless communication devices also simultaneously beamform noise in respective directions that are orthogonal to respective directions from the other wireless communication devices to the receiver. The other wireless communication devices also simultaneously beamforming noise makes decoding the transmission even harder for the eavesdropper, without degrading the reception of the data at the receiver.

In another aspect, the wireless communication device determines channel measurement information for a wireless communication channel between the wireless communication device and the receiver, and determines pseudorandom modifications using according to a rule known to the receiver, in other embodiments. The wireless communication device modulates data to be transmitted to the second communication device to generate unmodified transmission symbols, and modifies the unmodified transmission symbols with the pseudorandom modifications to generate modified transmission symbols. Because of channel reciprocity between a first channel direction from the wireless communication device to the receiver, and a second channel direction from the receiver to the wireless communication device, the receiver is also aware of the channel measurement information. Additionally, because the receiver knows the rule for determining the pseudorandom modifications and because the receiver knows the channel measurement information, the receiver is able to reverse the pseudorandom modifications made by the wireless communication device. On the other hand, the pseudorandom modifications made by the wireless communication device make it harder for the eavesdropper to decode the data that was transmitted.

Figure 1A:
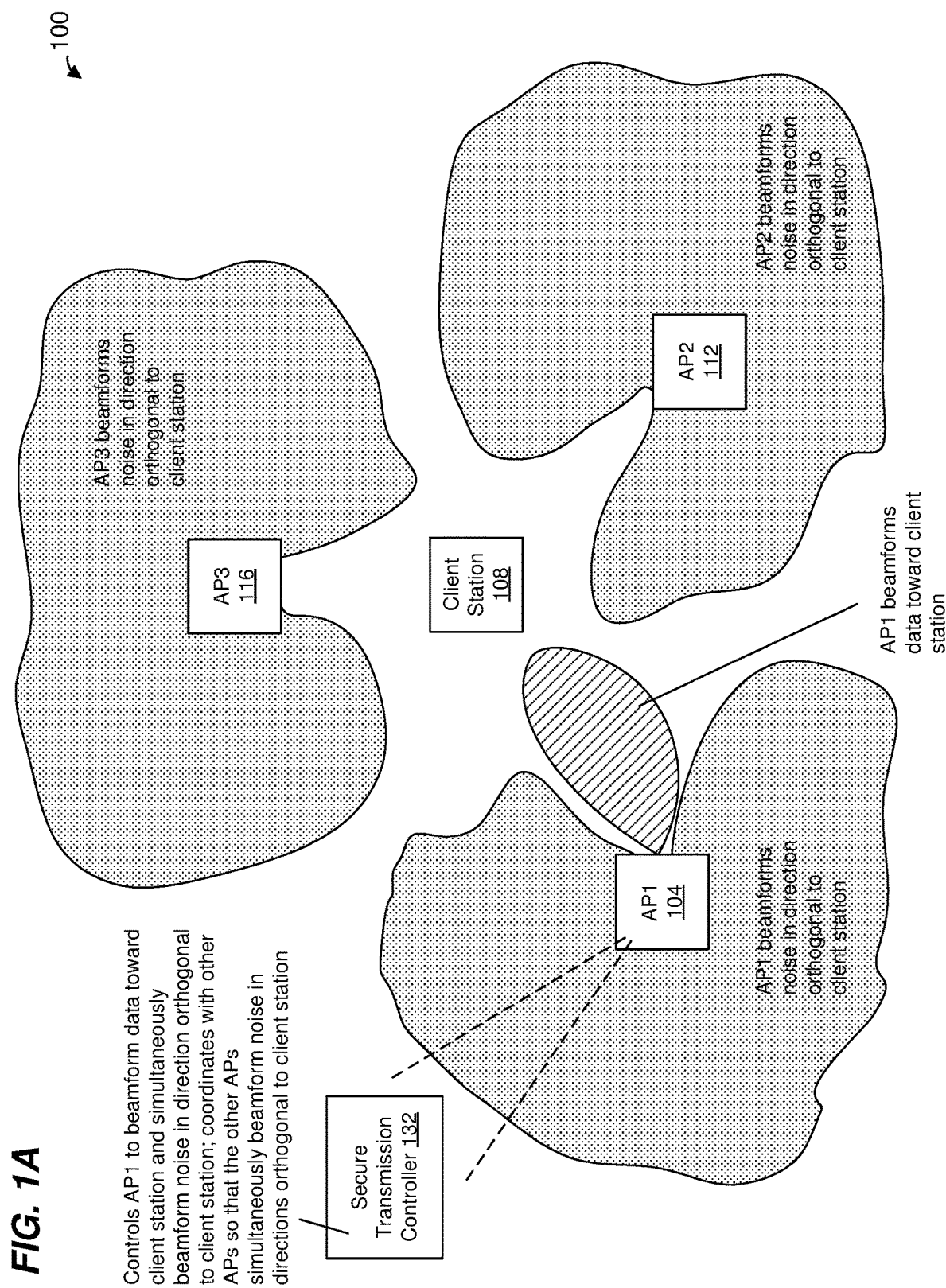
FIG. 1A is a diagram of an example communication system in which an access point transmits data to a client station using secure wireless communication techniques, according to an embodiment.

FIG. 1A is a diagram of an example communication system 100 that uses secure wireless communication techniques, according to an embodiment. FIG. 1A illustrates example techniques for securely transmitting data in a downlink direction (e.g., from access point 104 to a client station 108). The communication system 100 includes the access point 104 (AP1) and the client station 108. The communication system 100 also includes one or more other access points, such as an access point 112 (AP2) and an access point 116 (AP3). AP1 is capable of performing beamformed transmissions. For example, AP1 includes multiple antennas (not shown) and a beamforming network (not shown) that applies a beamforming matrix (or vector) to transmission signals that are transmitted via the multiple antennas. The other access points (e.g., AP2 and AP3) are similarly capable of performing beamformed transmissions. In some embodiments, the client station 108 is similarly capable of performing beamformed transmissions.

In an embodiment, AP1 and the other access points (including AP2 and AP3) are communicatively coupled via a wired network (not shown), such as an Ethernet network, an optical network, etc.

In an embodiment, when transmitting data to the client station 108, AP1 performs beamforming in a first spatial direction toward the client station 108, which reduces signal strength in other directions, thus making it harder for an eavesdropper (not located in the direction of the client station 108) to decode the transmission. Additionally, simultaneously with transmitting data to the client station 108, AP1 wirelessly transmits noise while performing beamforming in a second spatial direction that is orthogonal to the first spatial direction. Beamforming noise in the second spatial direction makes decoding the transmission even harder for an eavesdropper (not located in the direction of the client station 108), without degrading the reception of the data at the client station 108.

In some embodiments, AP1 coordinates with the other access points (including AP2 and AP3), e.g., via the wired communication network (not shown), so that the other access points also simultaneously beamform noise in respective third directions that are orthogonal to respective fourth directions from the other access points toward the client station 108, which makes decoding the transmission of data by AP1 even harder for the eavesdropper, without degrading the reception of the data at the client station 108.

In some embodiments, AP1 optionally selects a modulation and coding scheme (MCS) based on a signal to noise ratio (SNR) for a communication channel from AP1 to the client station 108, and uses the selected MCS when transmitting the data to the client station 108. For example, AP1 selects the MCS to be a highest MCS from a set of allowable MCSs that can be used for the SNR. In an embodiment, the highest MCS corresponds to a shortest range (among the set of allowable MCSs), thus making decoding the transmission of data by AP1 even harder for the eavesdropper.

AP1 includes a secure transmission controller 132. The secure transmission controller 132 is configured to control AP1 to perform beamforming in the first spatial direction when transmitting data to the client station 108, and to simultaneously transmit noise while performing beamforming in the second spatial direction. In some embodiments, the secure transmission controller 132 is also configured to select an MCS for the transmission to the client station 108 based on an SNR for the communication channel from AP1 to the client station 108. In some embodiments, the secure transmission controller 132 is also configured to coordinate with the other access points (e.g., including AP2 and AP3) so that the other access points also simultaneously beamform noise in the respective third directions.

Figure 1B:
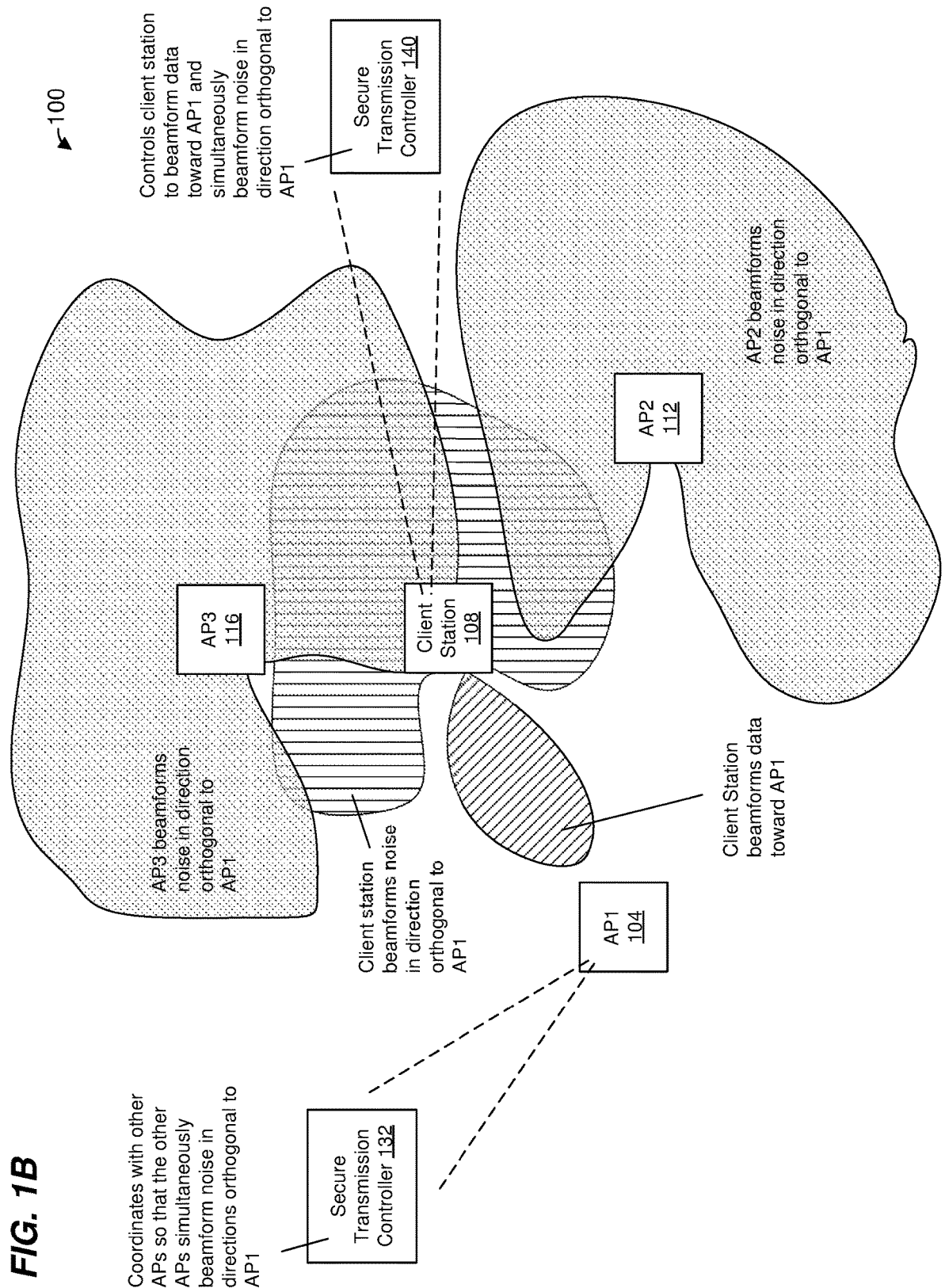
FIG. 1B is a diagram of the communication system of FIG. 1A, where the client station transmits data to the access point using secure wireless communication techniques, according to another embodiment.

FIG. 1B illustrates example techniques for securely transmitting data in an uplink direction (e.g., from the client station 108 to AP1). In an embodiment, when transmitting data to AP1, the client station 108 performs beamforming in a first spatial direction toward AP1, which reduces signal strength in other directions, thus making it harder for an eavesdropper (not located in the direction of AP1) to decode the transmission. Additionally, simultaneously with transmitting data to AP1, the client station 108 wirelessly transmits noise while performing beamforming in a second spatial direction that is orthogonal to the first spatial direction. Beamforming noise in the second spatial direction makes decoding the transmission even harder for an eavesdropper (not located in the direction of AP1), without degrading the reception of the data at AP1.

In some embodiments, AP1 coordinates with the other access points (including AP2 and AP3), e.g., via the wired communication network (not shown), so that the other access points also simultaneously beamform noise in respective third directions that are orthogonal to respective fourth directions from the other access points toward AP1, which makes decoding the transmission of data by the client station 108 even harder for the eavesdropper, without degrading the reception of the data at AP1.

In some embodiments, the client station 108 selects an MCS based on an SNR for a communication channel from the client station 108 to AP1, and uses the selected MCS when transmitting the data to AP1. For example, the client station 108 selects the MCS to be a highest MCS from a set of allowable MCSs that can be used for the SNR. In an embodiment, the highest MCS corresponds to a shortest range (among the set of allowable MCSs), thus making decoding the transmission of data by the client station 108 even harder for the eavesdropper.

The client station 108 includes a secure transmission controller 140. The secure transmission controller 140 is configured to control the client station 108 to perform beamforming in the first spatial direction when transmitting data to AP1, and to simultaneously transmit noise while performing beamforming in the second spatial direction. In some embodiments, the secure transmission controller 140 is also configured to select an MCS for the transmission to AP1 based on an SNR for the communication channel from the client station 108 to AP1.

In some embodiments, the secure transmission controller 132 of AP1 is configured to coordinate with the other access points (e.g., including AP2 and AP3) so that the other access points also simultaneously beamform noise in the respective third directions.

Figure 2:
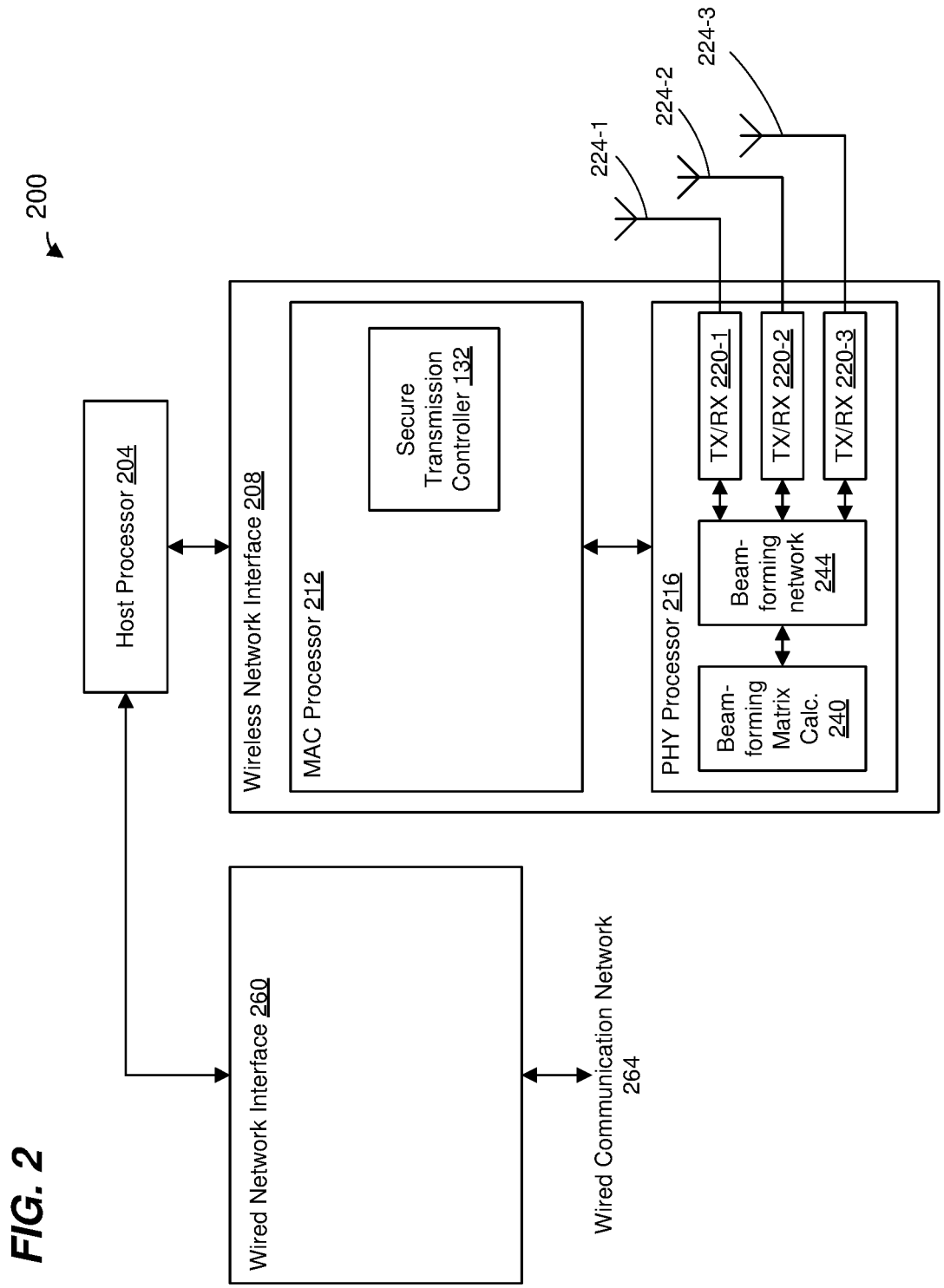
FIG. 2 is a diagram of an example access point of FIGS. 1A and 1B that is configured to use secure wireless communication techniques, according to an embodiment.

FIG. 2 is a diagram of an example access point (AP) 200 that is used as AP1 in FIGS. 1A and/or 1B, according to an embodiment. In some embodiments, AP2 and AP3 of FIGS. 1A and 1B have the same, or a similar, structure as the AP 200.

The AP 200 comprises a host processor 204 coupled to a wireless network interface device 208. The wireless network interface device 208 includes one or more medium access control (MAC) processors 212 (sometimes referred to herein as "the MAC processor 212" for brevity) and one or more physical layer (PHY) processors 216 (sometimes referred to herein as "the PHY processor 216" for brevity). The MAC processor 212 includes the secure transmission controller 132 discussed above with reference to FIGS. 1A-B.

The PHY processor 216 includes a plurality of transceivers 220, and the transceivers 220 are coupled to a plurality of antennas 224. Although three transceivers 220 and three antennas 224 are illustrated in FIG. 2, the AP 200 includes other suitable numbers (e.g., 2, 4, 5, etc.) of transceivers 220 and antennas 224 in other embodiments. In some embodiments, the AP 200 includes a larger number of antennas 224 than transceivers 220, and antenna switching techniques are utilized.

The PHY processor 216 also includes a beamforming matrix calculator 240. The beamforming matrix calculator 240 is configured to calculate a beamforming matrix for i) transmitting data in a first spatial direction towards the client station 108, and ii) transmitting noise in a second spatial direction that is orthogonal to the first spatial direction, according to an embodiment. In an embodiment, the beamforming matrix comprises i) one or more beamforming vectors for transmitting data in the first spatial direction, and ii) one or more beamforming vectors for transmitting noise in the second spatial direction, according to an embodiment. The beamforming matrix calculator 240 is configured to calculate the beamforming matrix using channel estimation feedback information from the client station 108. In an embodiment, the channel estimation feedback information from the client station 108 comprises beamforming matrix information (e.g., uncompressed beamforming matrix coefficients, compressed beamforming matrix information, etc.) corresponding to the first spatial direction towards the client station 108, and the beamforming matrix calculator 240 is configured to calculate the beamforming matrix using the beamforming matrix information received from the client station 108. In an embodiment, the channel estimation feedback information from the client station 108 comprises channel estimate measurement information, and the beamforming matrix calculator 240 is configured to calculate the beamforming matrix using the channel estimate measurement information received from the client station 108.

In some embodiments, the PHY processor 216 is configured to determine a channel estimate for a channel from the client station 108 to the AP 200, and the beamforming matrix calculator 240 calculates the beamforming matrix using the determined channel estimate. For example, the PHY processor 216 or the beamforming matrix calculator 240 assumes the channel estimate for the channel from the client station 108 to the AP 200 is a reciprocal of the channel from the AP 200 to the client station 108. In an embodiment, the PHY processor 216 is configured to determine a channel estimate based on measurements made for a packet (e.g., a null data packet (NDP), a sounding packet, etc.) received from the client station 108 and that includes training signals; and the beamforming matrix calculator 240 calculates the beamforming matrix using the channel estimate determined based on the measurements made for the packet received from the client station 108. In another embodiment, the PHY processor 216 is configured to determine a first channel estimate based on measurements made for a packet (e.g., an NDP, a sounding packet, etc.) received from the client station 108 and that includes training signals; the PHY processor 216 uses the first channel estimate to calculate a reciprocal second channel estimate for a channel from the AP 200 to the client station 108; and the beamforming matrix calculator 240 calculates the beamforming matrix using the second channel estimate.

In an embodiment, the beamforming matrix calculator 240 is implemented using hardware circuitry, such as logic circuitry. In another embodiment, the beamforming matrix calculator 240 is implemented at least partially using a processor that executes machine readable instructions stored in a memory.

The PHY processor 216 also includes a beamforming network 244 that is configured to apply beamforming matrices calculated by the beamforming matrix calculator 240 to i) data that is to be transmitted in the first spatial direction, and ii) the noise that is to be transmitted in the second spatial direction. In an embodiment, the beamforming network 244 is implemented using hardware circuitry, such as logic circuitry.

The wireless network interface device 208 is implemented using one or more integrated circuits (ICs) configured to operate as discussed below. For example, the MAC processor 212 may be implemented, at least partially, on a first IC, and the PHY processor 216 may be implemented, at least partially, on a second IC. As another example, at least a portion of the MAC processor 212 and at least a portion of the PHY processor 216 may be implemented on a single IC. For instance, the wireless network interface device 208 may be implemented using a system on a chip (SoC), where the SoC includes at least a portion of the MAC processor 212 and at least a portion of the PHY processor 216.

In an embodiment, the host processor 204 includes a processor configured to execute machine readable instructions stored in a memory device (not shown) such as a random access memory (RAM), a read-only memory (ROM), a flash memory, etc. In an embodiment, the host processor 204 may be implemented, at least partially, on a first IC, and the wireless network interface device 208 may be implemented, at least partially, on a second IC. As another example, the host processor 204 and at least a portion of the wireless network interface device 208 may be implemented on a single IC.

In various embodiments, the MAC processor 212 and/or the PHY processor 216 are configured to generate data units, and process received data units, that conform to a WLAN communication protocol. For example, the MAC processor 212 is configured to implement MAC layer functions, including MAC layer functions of the WLAN communication protocol, and the PHY processor 216 is configured to implement PHY functions, including PHY functions of the WLAN communication protocol. For instance, the MAC processor 212 is configured to generate MAC layer data units such as MAC service data units (MSDUs), MAC protocol data units (MPDUs), etc., and provide the MAC layer data units to the PHY processor 216, according to some embodiments. The PHY processor 216 is configured to receive MAC layer data units from the MAC processor 212 and encapsulate the MAC layer data units to generate PHY data units such as PHY protocol data units (PPDUs) for transmission via the antennas 224, according to some embodiments. Similarly, the PHY processor 216 is configured to receive PHY data units that were received via the antennas 224, and extract MAC layer data units encapsulated within the PHY data units, according to some embodiments. The PHY processor 216 provides the extracted MAC layer data units to the MAC processor 212, which processes the MAC layer data units, according to some embodiments.

PHY data units are sometimes referred to herein as "packets", and MAC layer data units are sometimes referred to herein as "frames".

In connection with generating one or more radio frequency (RF) signals for transmission, the PHY processor 216 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 216 is configured to upconvert the one or more analog baseband signals to one or more RF signals for transmission via the one or more antennas 224.

In connection with receiving one or more RF signals, the PHY processor 216 is configured to downconvert the one or more RF signals to one or more analog baseband signals, and to convert the one or more analog baseband signals to one or more digital baseband signals. The PHY processor 216 is further configured to process (which may include demodulating, filtering, etc.) the one or more digital baseband signals to generate a PPDU.

The PHY processor 216 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 2 for purposes of brevity.

The PHY processor 216 is configured to generate one or more RF signals that are provided to the one or more antennas 224. The PHY processor 216 is also configured to receive one or more RF signals from the one or more antennas 224.

The MAC processor 212 is configured to control the PHY processor 216 to generate one or more RF signals, for example, by providing one or more MAC layer data units (e.g., MPDUs) to the PHY processor 216, and optionally providing one or more control signals to the PHY processor 216, according to some embodiments. In an embodiment, the MAC processor 212 includes a processor configured to execute machine readable instructions stored in a memory device (not shown) such as a RAM, a read ROM, a flash memory, etc. In another embodiment, the MAC processor 212 includes a hardware state machine.

The AP 200 also includes a wired network interface device 260 coupled to a wired communication network 264. In an embodiment, the wired communication network 264 is an Ethernet network and the wired network interface device 260 comprises an Ethernet network interface device. In another embodiment, the wired communication network 264 is a fiber optic network and the wired network interface device 260 comprises an optical network interface device. In other embodiments, the wired communication network 264 is another suitable wired communication network and the wired network interface device 260 comprises another suitable network interface device for communicating via the wired communication network.

As discussed above, the MAC processor 212 includes the secure transmission controller 132. The secure transmission controller 132 is configured to prompt the PHY processor 216 to perform beamforming in the first spatial direction when transmitting data to the client station 108, and to simultaneously transmit noise while performing beamforming in the second spatial direction. In some embodiments, the secure transmission controller 132 is also configured to select an MCS based on an SNR for the communication channel from the AP 200 to the client station 108, and to control the PHY processor 216 to use the selected MCS for the transmission to the client station 108. In some embodiments, the secure transmission controller 132 is also configured to coordinate with the other access points (e.g., including AP2 and AP3) via the wired network interface device 260 and the wired communication network 264 so that the other access points also simultaneously beamform noise in the respective third directions.

In some embodiments, the secure transmission controller 132 is also configured to coordinate with the other access points (e.g., including AP2 and AP3) via the wired network interface device 260 and the wired communication network 264 so that the other access points simultaneously beamform noise while the client station 108 is transmitting data to the access point 200, as discussed above.

Similarly, in some embodiments, when another AP is transmitting to the client station 108 or the client station 108 is transmitting to the other AP, the secure transmission controller 132 is also configured to coordinate with the other AP via the wired network interface device 260 and the wired communication network 264 so that the AP 200 simultaneously beamforms noise while the other AP transmits data to the client station 108 or the client station 108 is transmitting data to the other AP.

In an embodiment, the secure transmission controller 132 is implemented by a processor (not shown) configured to execute machine readable instructions stored in a memory device (not shown) such as a RAM, a read ROM, a flash memory, etc. For example, the machine readable instructions cause the processor to perform one or more of the functions of the secure transmission controller 132 described herein. In another embodiment, the secure transmission controller 132 includes a hardware state machine that is configured to perform one or more of the functions of the functions of the secure transmission controller 132 described herein.

Referring again to FIGS. 1A and 1B, the other APs (including AP2 and AP3) have structure that is the same as or similar to the AP 200, in various embodiments.

Figure 3:
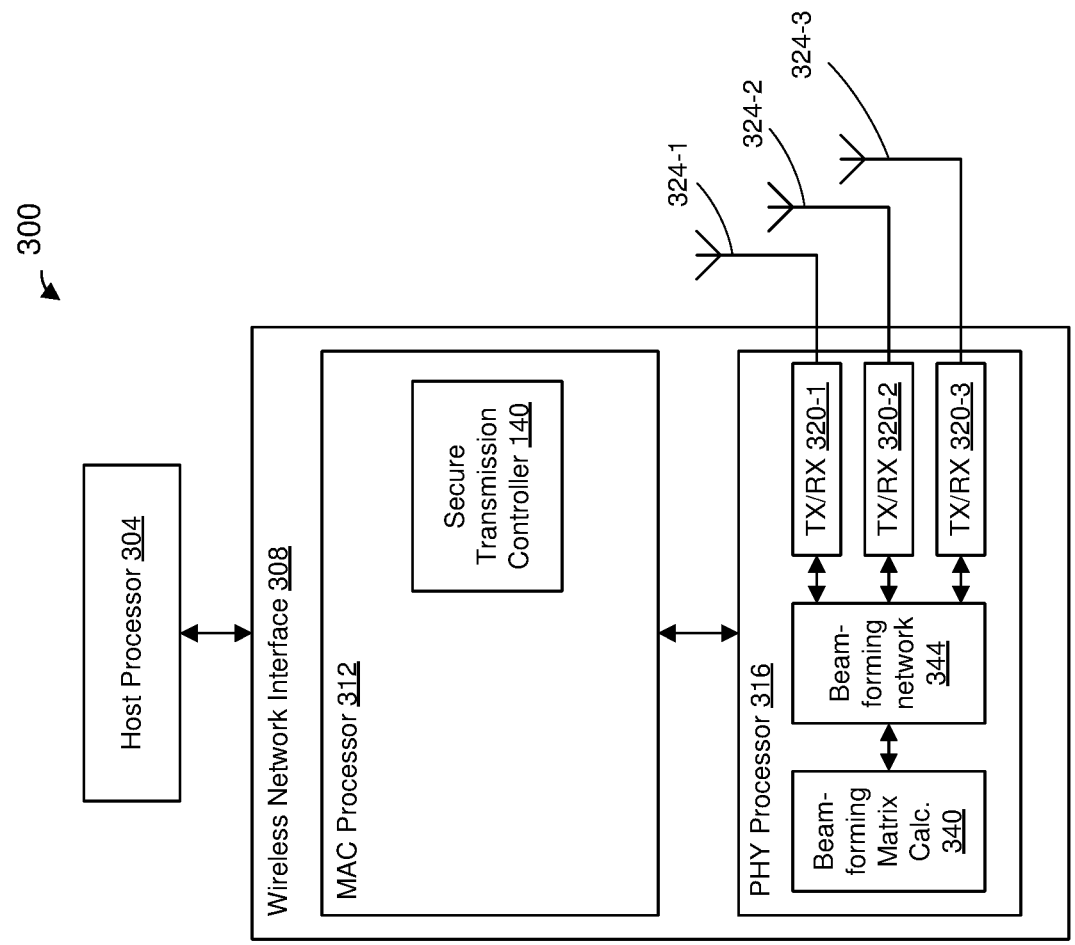
FIG. 3 is a diagram of an example client station of FIGS. 1A and 1B that is configured to use secure wireless communication techniques, according to an embodiment.

FIG. 3 is a diagram of an example client station 300 that is used as the client station 108 in FIGS. 1A and/or 1B, according to an embodiment. The client station 300 comprises a host processor 304 coupled to a wireless network interface device 308. The wireless network interface device 308 includes one or more MAC processors 312 (sometimes referred to herein as "the MAC processor 312" for brevity) and one or more PHY processors 316 (sometimes referred to herein as "the PHY processor 316" for brevity). The MAC processor 312 includes the secure transmission controller 140 discussed above with reference to FIG. 1B.

The PHY processor 316 includes a plurality of transceivers 320, and the transceivers 320 are coupled to a plurality of antennas 324. Although three transceivers 320 and three antennas 324 are illustrated in FIG. 3, the client station 300 includes other suitable numbers (e.g., 2, 4, 5, etc.) of transceivers 320 and antennas 324 in other embodiments. In some embodiments, the client station 300 includes a larger number of antennas 324 than transceivers 320, and antenna switching techniques are utilized.

The PHY processor 316 also includes a beamforming matrix calculator 340. The beamforming matrix calculator 340 is configured to calculate a beamforming matrix for i) transmitting data in a first spatial direction towards AP1, and ii) transmitting noise in a second spatial direction that is orthogonal to the first spatial direction, according to an embodiment. In an embodiment, the beamforming matrix comprises i) one or more beamforming vectors for transmitting data in the first spatial direction, and ii) one or more beamforming vectors for transmitting noise in the second spatial direction, according to an embodiment. The beamforming matrix calculator 340 is configured to calculate the beamforming matrix using channel estimation feedback information from AP1. In an embodiment, the channel estimation feedback information from AP1 comprises beamforming matrix information (e.g., uncompressed beamforming matrix coefficients, compressed beamforming matrix information, etc.) corresponding to the first spatial direction towards AP1, and the beamforming matrix calculator 340 is configured to calculate the beamforming matrix using the beamforming matrix information received from AP1. In an embodiment, the channel estimation feedback information from AP1 comprises channel estimate measurement information, and the beamforming matrix calculator 340 is configured to calculate the beamforming matrix using the channel estimate measurement information received from AP1.

In some embodiments, the PHY processor 316 is configured to determine a channel estimate for a channel from AP1 to the client station 300, and the beamforming matrix calculator 340 calculates the beamforming matrix using the determined channel estimate. For example, the PHY processor 316 or the beamforming matrix calculator 340 assumes the channel estimate for the channel from AP1 to the client station 300 is a reciprocal of the channel from the client station 300 to AP1, and thus uses a channel estimate made by the client station 300 (e.g., by the PHY processor 316) for the channel from AP1 to the client station 300 to determine a channel estimate for the channel from the client station 300 to AP1. In particular, the PHY processor 316 is configured to determine a channel estimate based on measurements made for a packet (e.g., an NDP, a sounding packet, etc.) received from AP1 and that includes training signals; and the beamforming matrix calculator 340 calculates the beamforming matrix using the channel estimate determined based on the measurements made for the packet received from AP1, according to an embodiment. In another embodiment, the PHY processor 316 is configured to determine a first channel estimate based on measurements made for a packet (e.g., an NDP, a sounding packet, etc.) received from AP1 and that includes training signals; the PHY processor 316 uses the first channel estimate to calculate a reciprocal second channel estimate for a channel from the client station 300 to AP1; and the beamforming matrix calculator 340 calculates the beamforming matrix using the second channel estimate. In other embodiments, however, the beamforming matrix calculator 340 calculates the beamforming matrix using channel estimation feedback information from AP1 as described previously rather than using a channel estimate for the channel from AP1 to the client station 300 and assuming channel reciprocity.

In an embodiment, the beamforming matrix calculator 340 is implemented using hardware circuitry, such as logic circuitry. In another embodiment, the beamforming matrix calculator 340 is implemented at least partially using a processor that executes machine readable instructions stored in a memory.

The PHY processor 316 also includes a beamforming network 344 that is configured apply the beamforming matrix calculated by the beamforming matrix calculator 340 to i) data that is to be transmitted in the first spatial direction, and ii) the noise that is to be transmitted in the second spatial direction. In an embodiment, the beamforming network 344 is implemented using hardware circuitry, such as logic circuitry.

The wireless network interface device 308 is implemented using one or more ICs configured to operate as discussed below. For example, the MAC processor 312 may be implemented, at least partially, on a first IC, and the PHY processor 316 may be implemented, at least partially, on a second IC. As another example, at least a portion of the MAC processor 312 and at least a portion of the PHY processor 316 may be implemented on a single IC. For instance, the wireless network interface device 308 may be implemented using an SoC, where the SoC includes at least a portion of the MAC processor 312 and at least a portion of the PHY processor 316.

In an embodiment, the host processor 304 includes a processor configured to execute machine readable instructions stored in a memory device (not shown) such as a RAM, a ROM, a flash memory, etc. In an embodiment, the host processor 304 may be implemented, at least partially, on a first IC, and the wireless network interface device 308 may be implemented, at least partially, on a second IC. As another example, the host processor 304 and at least a portion of the wireless network interface device 308 may be implemented on a single IC.

In various embodiments, the MAC processor 312 and/or the PHY processor 316 are configured to generate data units, and process received data units, that conform to a WLAN communication protocol. For example, the MAC processor 312 is configured to implement MAC layer functions, including MAC layer functions of the WLAN communication protocol, and the PHY processor 316 is configured to implement PHY functions, including PHY functions of the WLAN communication protocol. For instance, the MAC processor 312 is configured to generate MAC layer data units such as MSDUs, MPDUs, etc., and provide the MAC layer data units to the PHY processor 316, according to some embodiments. The PHY processor 316 is configured to receive MAC layer data units from the MAC processor 312 and encapsulate the MAC layer data units to generate PHY data units such as PPDUs for transmission via the antennas 324, according to some embodiments. Similarly, the PHY processor 316 is configured to receive PHY data units that were received via the antennas 324, and extract MAC layer data units encapsulated within the PHY data units, according to some embodiments. The PHY processor 316 provides the extracted MAC layer data units to the MAC processor 312, which processes the MAC layer data units, according to some embodiments.

In connection with generating one or more RF signals for transmission, the PHY processor 316 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 316 is configured to upconvert the one or more analog baseband signals to one or more RF signals for transmission via the one or more antennas 224.

In connection with receiving one or more RF signals, the PHY processor 316 is configured to downconvert the one or more RF signals to one or more analog baseband signals, and to convert the one or more analog baseband signals to one or more digital baseband signals. The PHY processor 316 is further configured to process (which may include demodulating, filtering, etc.) the one or more digital baseband signals to generate a PPDU.

The PHY processor 316 includes amplifiers (e.g., an LNA), a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 3 for purposes of brevity.

The PHY processor 316 is configured to generate one or more RF signals that are provided to the one or more antennas 324. The PHY processor 316 is also configured to receive one or more RF signals from the one or more antennas 324.

The MAC processor 312 is configured to control the PHY processor 316 to generate one or more RF signals, for example, by providing one or more MAC layer data units (e.g., MPDUs) to the PHY processor 316, and optionally providing one or more control signals to the PHY processor 316, according to some embodiments. In an embodiment, the MAC processor 312 includes a processor configured to execute machine readable instructions stored in a memory device (not shown) such as a RAM, a read ROM, a flash memory, etc. In another embodiment, the MAC processor 312 includes a hardware state machine.

As discussed above, the MAC processor 312 includes the secure transmission controller 140. The secure transmission controller 140 is configured to prompt the PHY processor 316 to perform beamforming in the first spatial direction when transmitting data to the AP1, and to simultaneously transmit noise while performing beamforming in the second spatial direction. In some embodiments, the secure transmission controller 140 is also configured to select an MCS based on an SNR for the communication channel from the client station 300 to AP1, and to control the PHY processor 316 to use the selected MCS for the transmission to AP1.

In an embodiment, the secure transmission controller 140 is implemented by a processor (not shown) configured to execute machine readable instructions stored in a memory device (not shown) such as a RAM, a read ROM, a flash memory, etc. For example, the machine readable instructions cause the processor to perform one or more of the functions of the secure transmission controller 140 described herein. In another embodiment, the secure transmission controller 140 includes a hardware state machine that is configured to perform one or more of the functions of the functions of the secure transmission controller 140 described herein.

Figure 4:
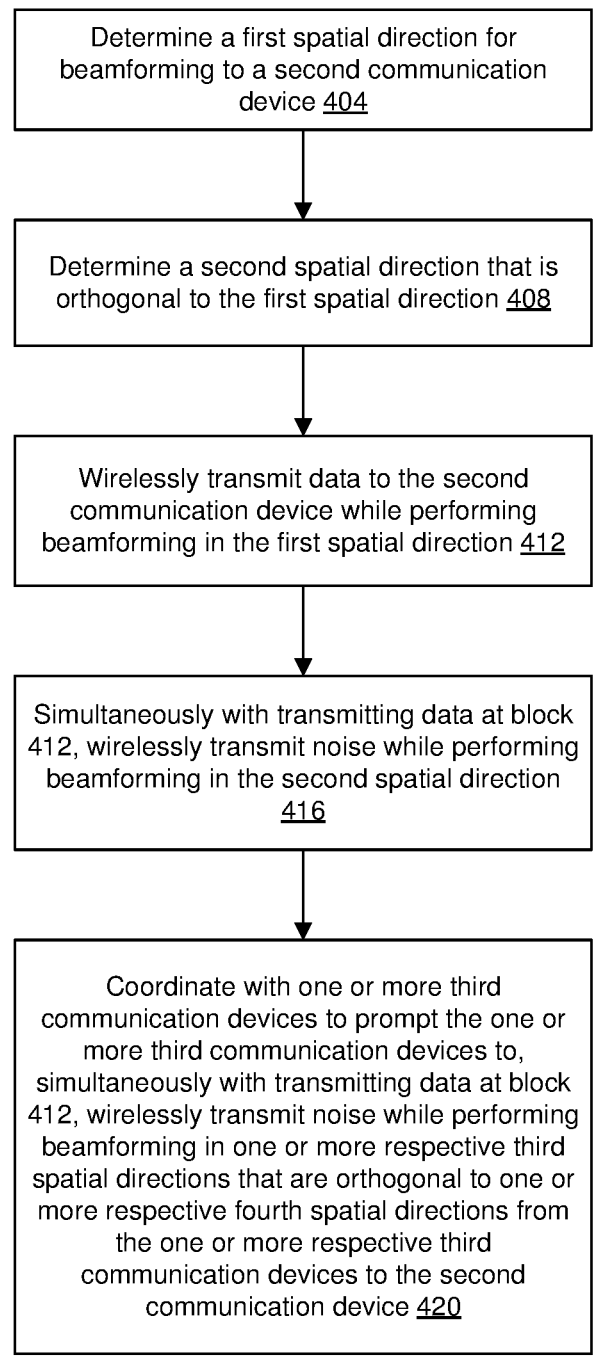
FIG. 4 is a flow diagram of an example method, e.g., implemented in the communication system of FIGS. 1A and 1B, for a first communication device to securely transmit data to a second communication device, according to an embodiment.

FIG. 4 is a flow diagram of an example method 400 for securely communicating in a wireless communication network, such as a WLAN, according to an embodiment. The method 400 is implemented in the example communication system 100 of FIGS. 1A and 1B, in an embodiment, and the method 400 is described with reference to FIGS. 1A and 1B for explanatory purposes. For example, the method 400 is described with reference to a first communication, a second communication device, and one or more third communication devices, and in one scenario, the first communication device corresponds to AP1, the second communication device corresponds to the client station 108, and the one or more third communication devices correspond to AP2 and AP3. In another scenario, the first communication device corresponds to the client station 108, the second communication device corresponds to AP1, and the one or more third communication devices correspond to AP2 and AP3. In other embodiments, however, the method 400 is implemented in another suitable communication system different from the communication system 100.

In an embodiment, the wireless network interface device 208 (FIG. 2) is configured to implement the method 400. For example, the secure transmission controller 132 is configured to implement at least a portion of the method 400. In another embodiment, the wireless network interface device 308 (FIG. 3) is configured to implement the method 400. For example, the secure transmission controller 140 is configured to implement at least a portion of the method 400. The method 400 is described with reference to FIGS. 2 and 3 for explanatory purposes. In other embodiments, however, the method 400 is implemented at least partially by another suitable communication device different from the wireless network interface device 208 (FIG. 2) and/or the wireless network interface device 308 (FIG. 3), such as by another suitable WLAN network interface device.

At block 404, a first communication device determines (e.g., the wireless network interface device 208 determines, the PHY processor 216 determines, the wireless network interface device 308 determines, the PHY processor 316 determines, etc.) a first spatial direction for beamforming to a second communication device as part of a secure transmission. In an embodiment, determining the first spatial direction at block 404 comprises determining the first spatial direction using channel measurement information for a communication channel between the first communication device and the second communication device. In an embodiment, determining the first spatial direction at block 404 comprises determining a beamforming matrix (e.g., a consisting of a vector, or including multiple rows and multiple columns) corresponding to beamforming in the first spatial direction.

In an embodiment, the first communication device determines channel measurement information for a communication channel from the first communication device to the second communication device by transmitting a packet having training signals (e.g., an NDP, a sounding packet, etc.) to the second communication device, and receiving channel estimation feedback from the second communication device, the channel estimation feedback including the channel measurement information for the communication channel from the first communication device to the second communication device. For example, in an embodiment in which the first communication is the AP 200 of FIG. 2, the MAC processor 212 controls (e.g., the secure transmission controller 132 controls) the PHY processor 216 to transmit the packet having training signals (e.g., an NDP, a sounding packet, etc.); the PHY processor 216 receives the channel estimation feedback and the PHY processor 216 uses the channel estimation feedback to calculate (e.g., the beamforming matrix calculator 240 calculates) a beamforming matrix (e.g., a consisting of a vector, or including multiple rows and multiple columns) for transmit beamforming to the second communication device. As another example, in an embodiment in which the first communication is the client station 300 of FIG. 3, the MAC processor 312 controls (e.g., the secure transmission controller 140 controls) the PHY processor 316 to transmit the packet having training signals (e.g., an NDP, a sounding packet, etc.); the PHY processor 316 receives the channel estimation feedback and the PHY processor 316 uses the channel estimation feedback to calculate (e.g., the beamforming matrix calculator 340 calculates) a beamforming matrix (e.g., a consisting of a vector, or including multiple rows and multiple columns) for transmit beamforming to the second communication device.

In some embodiments, the channel estimation feedback comprises beamforming feedback. For instance, in some embodiments, the second communication device calculates a beamforming matrix for the first communication device to use when transmit beamforming to the second communication device, and the second communication includes the beamforming matrix (or a compressed form of the beamforming matrix) in the beamforming feedback. In such embodiments, the first communication device does not need to separately calculate the beamforming matrix but rather adopts the beamforming matrix provided by the second communication device. The second communication device uses the channel measurement information to calculate the beamforming matrix, and the beamforming matrix may be considered channel measurement information, in some embodiments.

In another embodiment implemented in the communication system of FIGS. 1A and 1B, the first communication device determines channel measurement information for a communication channel from the first communication device to the second communication device by jointly transmitting (with one or more third communication devices, such as AP2 and AP3) a packet having training signals (e.g., an NDP, a sounding packet, etc.) to the second communication device, and receiving channel estimation feedback from the second communication device, the channel estimation feedback including the channel measurement information for the communication channel i) from the first communication device and the one or more third communication devices, ii) to the second communication device. In an embodiment, coordinating with the one or more third communication devices comprises synchronizing transmission by the first communication device with transmission(s) by the one or more third communication devices.

In an embodiment in which the first communication device jointly transmits (with one or more third communication devices, such as AP2 and AP3) the packet having training signals, the MAC processor 212 controls (e.g., the secure transmission controller 132 controls) the PHY processor 216 to transmit as part of the joint transmission of the packet having training signals. The PHY processor 216 receives the channel estimation feedback from the second communication device (which includes the channel measurement information for the communication channel i) from the first communication device and the one or more third communication devices, ii) to the second communication device), and the PHY processor 216 uses the channel estimation feedback to calculate (e.g., the beamforming matrix calculator 240 calculates) a beamforming matrix (e.g., a consisting of a vector, or including multiple rows and multiple columns) for transmit beamforming to the second communication device.

In another embodiment, the first communication device determines channel measurement information for a communication channel from the first communication device to the second communication device by receiving from the second communication device a packet having training signals (e.g., an NDP, a sounding packet, etc.), and generating first channel measurement information based on reception of the packet having training signals, the first channel measurement information for a communication channel from the second communication device to the first communication device. Assuming channel reciprocity, the first communication device then uses the first channel measurement information to determine second channel measurement information for a communication channel from the first communication device to the second communication device. For example, the PHY processor 216 generates the first channel measurement information, uses the first channel measurement information to generate the second channel measurement information, and uses the second channel measurement information to calculate (e.g., the beamforming matrix calculator 240 calculates) a beamforming matrix (e.g., a consisting of a vector, or including multiple rows and multiple columns) for transmit beamforming to the second communication device. As another example, the PHY processor 316 generates the first channel measurement information, uses the first channel measurement information to generate the second channel measurement information, and uses the second channel measurement information to calculate (e.g., the beamforming matrix calculator 340 calculates) a beamforming matrix (e.g., a consisting of a vector, or including multiple rows and multiple columns) for transmit beamforming to the second communication device.

In some embodiments, the channel measurement information for the communication channel from the first communication device to the second communication device comprises a channel estimate matrix, and determining the first spatial direction at block 404 comprises determining an eigenvector of the channel estimate matrix corresponding to the first spatial direction. In some embodiments, the first communication device uses (e.g., the wireless network interface device 208 uses, the PHY processor 216 uses, the beamforming network 244 uses, the wireless network interface device 308 uses, the PHY processor 316 uses, the beamforming network 344 uses, etc.) the eigenvector as a beamforming matrix for beamforming in the first spatial direction. In some embodiments, the first communication device uses (e.g., the wireless network interface device 208 uses, the PHY processor 216 uses, the beamforming network 244 uses, the wireless network interface device 308 uses, the PHY processor 316 uses, the beamforming network 344 uses, etc.) the eigenvector to generate a beamforming matrix for beamforming in the first spatial direction.

At block 408, the first communication device determines (e.g., the wireless network interface device 208 determines, the PHY processor 216 determines, the wireless network interface device 308 determines, the PHY processor 316 determines, etc.) a second spatial direction that is orthogonal to the first spatial direction. In an embodiment, determining the second spatial direction at block 408 comprises determining the second spatial direction using the channel measurement information for the communication channel between the first communication device and the second communication device (e.g., as discussed above with respect to block 404). In an embodiment, determining the second spatial direction at block 408 comprises determining a beamforming matrix (e.g., a consisting of a vector, or including multiple rows and multiple columns) corresponding to beamforming in the second spatial direction.

In some embodiments, determining the first spatial direction at block 404 comprises determining a first beamforming matrix for beamforming in the first spatial direction, and block 408 comprises using the first beamforming matrix to calculate (e.g., the wireless network interface 208 calculates, the PHY processor 216 calculates, the beamforming matrix calculator 240 calculates, the wireless network interface 308 calculates, the PHY processor 316 calculates, the beamforming matrix calculator 340 calculates, etc.) a second beamforming matrix that is orthogonal to the first spatial direction.

In some embodiments, determining the first spatial direction at block 404 comprises using channel measurement information for the communication channel from the first communication device to the second communication device (e.g., a channel estimate matrix) to determine the first beamforming matrix for beamforming in the first spatial direction, and block 408 comprises using the channel measurement information (e.g., the channel estimate matrix) to calculate (e.g., the wireless network interface 208 calculates, the PHY processor 216 calculates, the beamforming matrix calculator 240 calculates, the wireless network interface 308 calculates, the PHY processor 316 calculates, the beamforming matrix calculator 340 calculates, etc.) the second beamforming matrix for beamforming in the second spatial direction. In some embodiments, the second beamforming matrix is generated to correspond to a null space of the channel estimate matrix.

In some embodiments, the second beamforming matrix is calculated to correspond to wide beam pattern with a null in the first spatial direction. In some embodiments, the second beamforming matrix is calculated to correspond to a generally omnidirectional beam pattern but with a null in the first spatial direction.

At block 412, the first communication device wirelessly transmits (e.g., the wireless network interface 208 transmits, the PHY processor 216 transmits, the wireless network interface 308 transmits, the PHY processor 316 transmits, etc.) data to the second communication device while performing beamforming in the first spatial direction. In an embodiment, transmitting the data at block 412 includes using (e.g., the wireless network interface 208 uses, the PHY processor 216 uses, the beamforming network 244 uses, the wireless network interface 308 uses, the PHY processor 316 uses, the beamforming network 344 uses, etc.) a beamforming matrix, corresponding to the first spatial direction, to perform beamforming in the first spatial direction.

At block 416, the first communication device wirelessly transmits (e.g., the wireless network interface 208 transmits, the PHY processor 216 transmits, the wireless network interface 308 transmits, the PHY processor 316 transmits, etc.) noise while performing beamforming in the second spatial direction simultaneously with wirelessly transmitting the data at block 412. In an embodiment, transmitting the noise at block 416 includes using (e.g., the wireless network interface 208 uses, the PHY processor 216 uses, the beamforming network 244 uses, the wireless network interface 308 uses, the PHY processor 316 uses, the beamforming network 344 uses, etc.) a beamforming matrix, corresponding to the second spatial direction, to perform beamforming in the second spatial direction. In an embodiment, the noise comprises random (or pseudorandom) data that is modulated to generate a transmission signal. In another embodiment, the noise comprises a random (or pseudorandom) signal that is generated without modulating data.

Optionally, at block 420, the first communication device coordinates (e.g., the wireless network interface 208 coordinates, the MAC processor 212 coordinates, the secure transmission controller 132 coordinates, etc.) with one or more third communication devices to prompt the one or more third communication devices to, simultaneously with the first communication device wirelessly transmitting the data to the second communication device at block 412, wirelessly transmit noise while performing beamforming in one or more respective third spatial directions that are orthogonal to one or more respective fourth spatial directions from the one or more respective third communication devices to the second communication device. In an embodiment, coordinating with the one or more third communication devices at block 420 comprises the first communication device communicating (e.g., the wireless network interface 208 communicating, the MAC processor 212 communicating, the secure transmission controller 132 communicating, etc.) with the one or more third communication devices via the wired network interface 260 and via the wired communication network 264. In an embodiment, coordinating with the one or more third communication devices at block 420 comprises the first communication device transmitting (e.g., the wireless network interface 208 communicating, the MAC processor 212 communicating, the secure transmission controller 132 communicating, etc.) via the wired network interface 260 and via the wired communication network 264 a start time and a duration for the one or more third communication devices to transmit noise while performing beamforming in one or more respective third spatial directions.

In some embodiments, block 420 is omitted, i.e., the first communication device does not coordinate with any third communication devices in connection with transmitting the data to the second communication device at block 412. For example, in some embodiments in which the first communication device is the client station 108/300, the client station 108/300 does not coordinate with any third communication devices in connection with transmitting the data to the AP 104/200 at block 412. As another example, in some embodiments in which the first communication device is the AP 104/200, the AP 104/200 does not coordinate with any third communication devices in connection with transmitting the data to the client station 108/300 at block 412.

Figure 5:
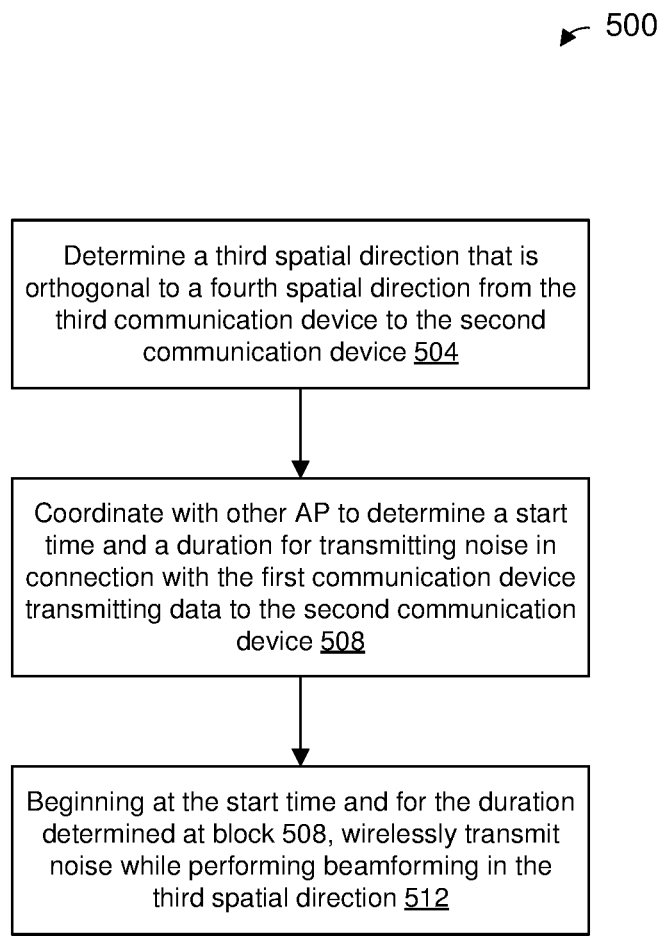
FIG. 5 is a flow diagram of another example method that is used in conjunction with the method of FIG. 4, where a third communication device transmits noise while the first communication device transmits data to the second communication device, according to another embodiment.

As discussed above, in some embodiments, the AP 104/200 coordinates with one or more third communication devices (e.g., AP2 and AP3) so that, simultaneously with the AP 104/200 transmitting data to the client station 108/300, or simultaneously with the client station 108/300 transmitting data to the AP 104/200, wirelessly transmit noise while performing beamforming. FIG. 5 is a flow diagram of an example method 500 implemented by a third communication device (e.g., AP2 and AP3), according to an embodiment. The method 500 is implemented in the example communication system 100 of FIGS. 1A and 1B, in an embodiment, and the method 500 is described with reference to FIGS. 1A and 1B for explanatory purposes. In particular, the method 500 is described in the context of AP2 implementing the method 500. For example, the method 500 is described with reference to a first communication, a second communication device, and a third communication device, and in one scenario, the first communication device corresponds to AP1, the second communication device corresponds to the client station 108, and the third communication device corresponds to AP2. In another scenario, the first communication device corresponds to the client station 108, the second communication device corresponds to AP1, and the third communication device corresponds to AP2. In other embodiments, however, the method 500 is implemented in another suitable communication system different from the communication system 100.

In an embodiment, the wireless network interface device 208 (FIG. 2) is configured to implement the method 500. For example, the secure transmission controller 132 is configured to implement at least a portion of the method 500. The method 500 is described with reference to FIG. 2 for explanatory purposes. In other embodiments, however, the method 500 is implemented at least partially by another suitable communication device different from the wireless network interface device 208 (FIG. 2), such as by another suitable WLAN network interface device.

At block 504, the third communication device determines (e.g., the wireless network interface device 208 determines, the PHY processor 216 determines, etc.) a third spatial direction that is orthogonal to a fourth spatial direction from the third communication device to the second communication device. In an embodiment, determining the third spatial direction at block 504 comprises determining the third spatial direction using channel measurement information for a communication channel between the third communication device and the second communication device. In an embodiment, determining the third spatial direction at block 504 comprises determining a beamforming matrix (e.g., a consisting of a vector, or including multiple rows and multiple columns) corresponding to beamforming in the third spatial direction.

In an embodiment, the third communication device determines channel measurement information for a communication channel from the third communication device to the second communication device by transmitting a packet having training signals (e.g., an NDP, a sounding packet, etc.) to the second communication device, and receiving channel estimation feedback from the second communication device, the channel estimation feedback including the channel measurement information for the communication channel from the third communication device to the second communication device. For example, the MAC processor 212 controls (e.g., the secure transmission controller 132 controls) the PHY processor 216 to transmit the packet having training signals (e.g., an NDP, a sounding packet, etc.); the PHY processor 216 receives the channel estimation feedback and the PHY processor 216 uses the channel estimation feedback to calculate (e.g., the beamforming matrix calculator 240 calculates) a beamforming matrix (e.g., a consisting of a vector, or including multiple rows and multiple columns) for transmit beamforming in the third spatial direction.

In another embodiment, the third communication device determines channel measurement information for a communication channel from the third communication device to the second communication device by jointly transmitting (with one or more other communication devices, such as with AP1 and AP3, or with the client station 108 and AP3) a packet having training signals (e.g., an NDP, a sounding packet, etc.) to the second communication device, and receiving channel estimation feedback from the second communication device, the channel estimation feedback including the channel measurement information for the communication channel i) from the third communication device and the one or more other communication devices (such as AP1 and AP3, or the client station 108 and AP3), ii) to the second communication device. In an embodiment, coordinating with the one or more other communication devices comprises synchronizing transmission by the third communication device with transmission(s) by the one or more other communication devices.

In an embodiment in which the third communication device jointly transmits (with one or more other communication devices, such as with AP1 and AP3, or with the client station 108 and AP3) the packet having training signals, the MAC processor 212 controls (e.g., the secure transmission controller 132 controls) the PHY processor 216 to transmit as part of the joint transmission of the packet having training signals. The PHY processor 216 receives the channel estimation feedback from the second communication device (which includes the channel measurement information for the communication channel i) from the third communication device and the one or more other communication devices, ii) to the second communication device), and the PHY processor 216 uses the channel estimation feedback to calculate (e.g., the beamforming matrix calculator 240 calculates) a beamforming matrix (e.g., a consisting of a vector, or including multiple rows and multiple columns) for transmit beamforming in the third spatial direction.

In another embodiment, the third communication device determines channel measurement information for a communication channel from the third communication device to the second communication device by receiving from the second communication device a packet having training signals (e.g., an NDP, a sounding packet, etc.), and generating first channel measurement information based on reception of the packet having training signals, the first channel measurement information for a communication channel from the second communication device to the third communication device. Assuming channel reciprocity, the third communication device then uses the first channel measurement information to determine second channel measurement information for a communication channel from the third communication device to the second communication device. For example, the PHY processor 216 generates the first channel measurement information, uses the first channel measurement information to generate the second channel measurement information, and uses the second channel measurement information to calculate (e.g., the beamforming matrix calculator 240 calculates) a beamforming matrix (e.g., a consisting of a vector, or including multiple rows and multiple columns) for transmit beamforming in the third spatial direction.

In some embodiments, the channel measurement information for the communication channel from the third communication device to the second communication device comprises a channel estimate matrix, and determining the third spatial direction at block 504 comprises using the channel measurement information (e.g., the channel estimate matrix) to calculate (e.g., the wireless network interface 208 calculates, the PHY processor 216 calculates, the beamforming matrix calculator 240 calculates, etc.) the beamforming matrix for beamforming in the third spatial direction. In some embodiments, the beamforming matrix is generated to correspond to a null space of the channel estimate matrix.

In some embodiments, the beamforming matrix is calculated to correspond to wide beam pattern with a null in the fourth spatial direction from the third communication device to the second communication device. In some embodiments, the beamforming matrix is calculated to correspond to a generally omnidirectional beam pattern but with a null in the fourth spatial direction.

At block 508, the third communication device coordinates (e.g., the wireless network interface 208 coordinates, the MAC processor 212 coordinates, the secure transmission controller 132 coordinates, etc.) with another AP (e.g., AP1) to determine a start time and a duration for transmitting noise in connection with the first communication device transmitting data to the second communication device. For example, the third communication device receives from the other AP (e.g., AP1) indications of a start time and a duration for transmitting noise in connection with the first communication device transmitting data to the second communication device. In an embodiment, coordinating at block 508 comprises coordinating via the wired network interface 260 and the wired communication network 264.

At block 512, the third communication device wirelessly transmits (e.g., the wireless network interface 208 transmits, the PHY processor 216 transmits, the wireless network interface 308 transmits, the PHY processor 316 transmits, etc.) noise while performing beamforming in the third spatial direction beginning at the start time and the duration determined at block 508. In an embodiment, transmitting the noise at block 512 includes using (e.g., the wireless network interface 208 uses, the PHY processor 216 uses, the beamforming network 244 uses, the wireless network interface 308 uses, the PHY processor 316 uses, the beamforming network 344 uses, etc.) a beamforming matrix, corresponding to the third spatial direction, to perform beamforming in the third spatial direction. In an embodiment, the noise comprises random (or pseudorandom) data that is modulated to generate a transmission signal. In another embodiment, the noise comprises a random (or pseudorandom) transmission signal that is generated without modulating data.

Figure 6:
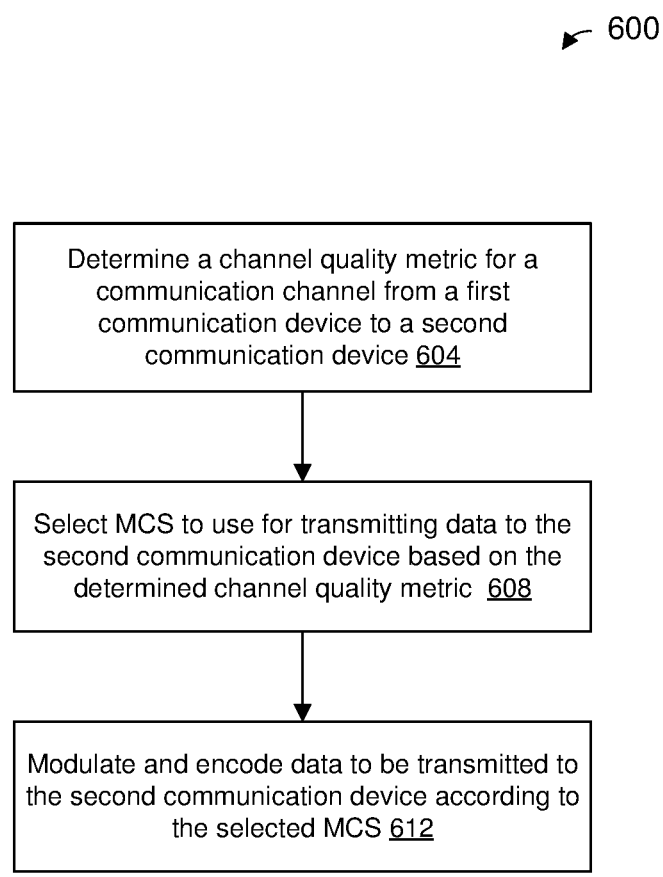
FIG. 6 is a flow diagram of another example method, e.g., optionally implemented in the communication system of FIGS. 1A and 1B, for a first communication device to securely transmit data to a second communication device, according to another embodiment.

To further increase security, the first communication device optionally selects an MCS to use when transmitting data to the second communication device to reduce the range of the transmission. FIG. 6 is a flow diagram of an example method 600 for securely communicating in a wireless communication network, such as a WLAN, according to an embodiment. The method 600 is optionally used in conjunction with one or more of the methods/techniques described above, in some embodiments.

The method 600 is implemented in the example communication system 100 of FIGS. 1A and 1B, in an embodiment, and the method 600 is described with reference to FIGS. 1A and 1B for explanatory purposes. For example, the method 600 is described with reference to a first communication and a second communication device, and in one scenario, the first communication device corresponds to AP1 and the second communication device corresponds to the client station 108. In another scenario, the first communication device corresponds to the client station 108 and the second communication device corresponds to AP1. In other embodiments, however, the method 600 is implemented in another suitable communication system different from the communication system 100.

In an embodiment, the wireless network interface device 208 (FIG. 2) is configured to implement the method 600. For example, the secure transmission controller 132 is configured to implement at least a portion of the method 600. In another embodiment, the wireless network interface device 308 (FIG. 3) is configured to implement the method 600. For example, the secure transmission controller 140 is configured to implement at least a portion of the method 600. The method 600 is described with reference to FIGS. 2 and 3 for explanatory purposes. In other embodiments, however, the method 600 is implemented at least partially by another suitable communication device different from the wireless network interface device 208 (FIG. 2) and/or the wireless network interface device 308 (FIG. 3), such as by another suitable WLAN network interface device.

At block 604, the first communication device determines (e.g., the wireless network interface device 208 determines, the MAC processor 212 determines, the secure transmission controller 132 determines, the PHY processor 216 determines, the wireless network interface device 308 determines, the MAC processor 312 determines, the secure transmission controller 140 determines, the PHY processor 316 determines, etc.) a signal quality metric for the communication channel from the first communication device to the second communication device. In some embodiments, the signal quality metric is an SNR. In another embodiment, the signal quality metric is a signal to interference plus noise ratio (SINR). In another embodiment, the signal quality metric is a received signal strength indicator (RSSI). In other embodiments, the signal quality metric is another suitable signal quality metric.

In some embodiments in which the first communication device transmits (either independently or jointly with one or more other communication devices) a packet having training signals (e.g., an NDP, a sounding packet, etc.) to the second communication device, and receives from the second communication device channel estimation feedback, the channel estimation feedback includes the quality metric for the for the communication channel from the first communication device to the second communication device. In some embodiments in which the first communication device generates channel measurement information based on a packet received from the second communication device, the channel measurement information generated by the first communication device includes the quality metric, e.g., a channel quality metric for the for the communication channel from the second communication device to the first communication device is assumed to be the same as the channel quality metric for the communication channel from the first communication device to the second communication device.

At block 608, the first communication device selects (e.g., the wireless network interface device 208 selects, the MAC processor 212 selects, the secure transmission controller 132 selects, the wireless network interface device 308 selects, the MAC processor 312 selects, the secure transmission controller 140 selects, etc.) an MCS to use for the transmission of data to the second communication device based on the channel quality metric determined at block 604.

The IEEE 802.11 Standard family defines a set of permitted MCSs that are generally arranged in an order corresponding to data rate. Generally, higher MCSs in the order correspond to higher data rates, whereas lower MCSs in the order correspond to lower data rates. Additionally, higher MCSs generally correspond to more complex modulation schemes (e.g., higher-order quadrature amplitude modulation (QAM)) and/or less robust error correction encoding (i.e., with less redundancy), whereas lower MCSs generally correspond to less complex modulation schemes (e.g., lower-order QAM for binary phase shift keying (BPSK)) and/or more robust error correction encoding (i.e., with more redundancy). Further, higher MCSs generally correspond to shorter range transmissions, whereas lower MCSs generally correspond to longer range transmissions.

The IEEE 802.11 Standard permits a station to use a range of MCSs up to a maximum MCS that is determined based on an SNR for a channel. In an embodiment, selecting the MCS at block 608 comprises selecting the maximum MCS corresponding to the channel quality metric (e.g., SNR) determined at block 604. In other words, unlike the IEEE 802.11 Standard that permits selecting an MCS from a range of MCSs, the selection of the MCS at block 608 is restricted to be the maximum MCS corresponding to the channel quality metric (e.g., SNR) determined at block 604, according to an embodiment. By restricting the MCS to the be the maximum MCS corresponding to the channel quality metric (e.g., SNR) determined at block 604, the transmission range is minimized, according to an embodiment, thus making it more difficult for an eavesdropper to decode the transmission.

At block 612, the first communication device modulates and encodes (e.g., the wireless network interface device 208 modulates and encodes, the PHY processor 216 modulates and encodes, the wireless network interface device 308 modulates and encodes, the PHY processor 316 modulates and encodes, etc.) the data to be transmitted to the second communication device according to the MCS selected at block 608.

In another optional technique to further increase security, APs randomly (or pseudorandomly) switch transmitting data to the client station 108 over time. As an illustrative example, during a first time period AP2 transmits data to the client station 108 using beamforming, while AP1 and AP3 transmit noise using beamforming, as discussed above; during a subsequent second time period AP1 transmits data to the client station 108 using beamforming, while AP2 and AP3 transmit noise using beamforming, as discussed above; and during a subsequent third time period AP3 transmits data to the client station 108 using beamforming, while AP1 and AP1 transmit noise using beamforming, as discussed above. APs randomly (or pseudorandomly) switching the transmission of data to the client station 108 over time is optionally used in conjunction with one or more of the methods/techniques described above, in some embodiments.

In some embodiments, data that is to be transmitted to the client station 108 is partitioned into a plurality of units of data. Each unit of data corresponds to a minimum length of data below which the data cannot be decoded, according to an embodiment. Each AP transmits a respective unit of data during a respective time period, while other APs transmit noise during the respective time period using techniques such as described above, where an order in which APs transmit data is random or pseudorandom.

In an embodiment, AP1 coordinates (e.g., over the wired communication network 264) with the one or more other APs (e.g., AP2 and AP3) so that AP1 and the other APs transmit data to the client station 108 in a random or pseudorandom order over time, such as described above. For example, in an embodiment, AP1 provides (e.g., over the wired communication network 264) respective data units to the other APs that are to be transmitted by the other APs to the client station 108. Additionally, AP1 provides (e.g., over the wired communication network 264) timing information to the other APs that indicates to the other APs when the other APs are to transmit the data units to the client station 108, according to an embodiment. AP1 also provides (e.g., over the wired communication network 264) timing information to the other APs that indicates to the other APs when the other APs are to transmit noise, according to an embodiment.

In another embodiment, AP1 provides (e.g., over the wired communication network 264) to the other APs the data that is to be transmitted to the client station 108. Additionally, AP1 generates respective sequences of precoding information that is to be used by AP1 and respective other APs (e.g., AP2 and AP3) over time when wirelessly transmitting. AP1 generates the respective sequences of precoding information so that, when used by AP1 and the respective other APs over time to wirelessly transmit, in effect AP1 and the other APs transmit data to the client station 108 in a random or pseudorandom order over time, according to an embodiment. AP1 generates the respective sequences of precoding information also so that, when used by AP1 and the respective other APs over time to wirelessly transmit, in effect AP1 and the other APs transmit noise when not transmitting data to the client station 108, according to an embodiment. AP1 provides (e.g., over the wired communication network 264) respective sequences of precoding information to respective other APs (e.g., AP2 and AP3), according to an embodiment.

In another optional technique to further increase security, a first communication device that is to transmit data to a second communication device randomly (or pseudorandomly) modifies transmission symbols that correspond to the data prior to transmitting the modified transmission symbols, where the random (or pseudorandom) modifications are determined according to key information that is also known by the second communication device; when the second communication receives the modified transmission symbols, the second communication device uses the key information to determine how reverse the random (or pseudorandom) modifications to recover the unmodified transmission symbols, according to an embodiment. Randomly (or pseudorandomly) modifying transmission symbols is optionally used in conjunction with one or more of the methods/techniques described above, in some embodiments. In other embodiments, however, randomly (or pseudorandomly) modifying transmission symbols is used without any of the methods/techniques described above.

Figure 7:
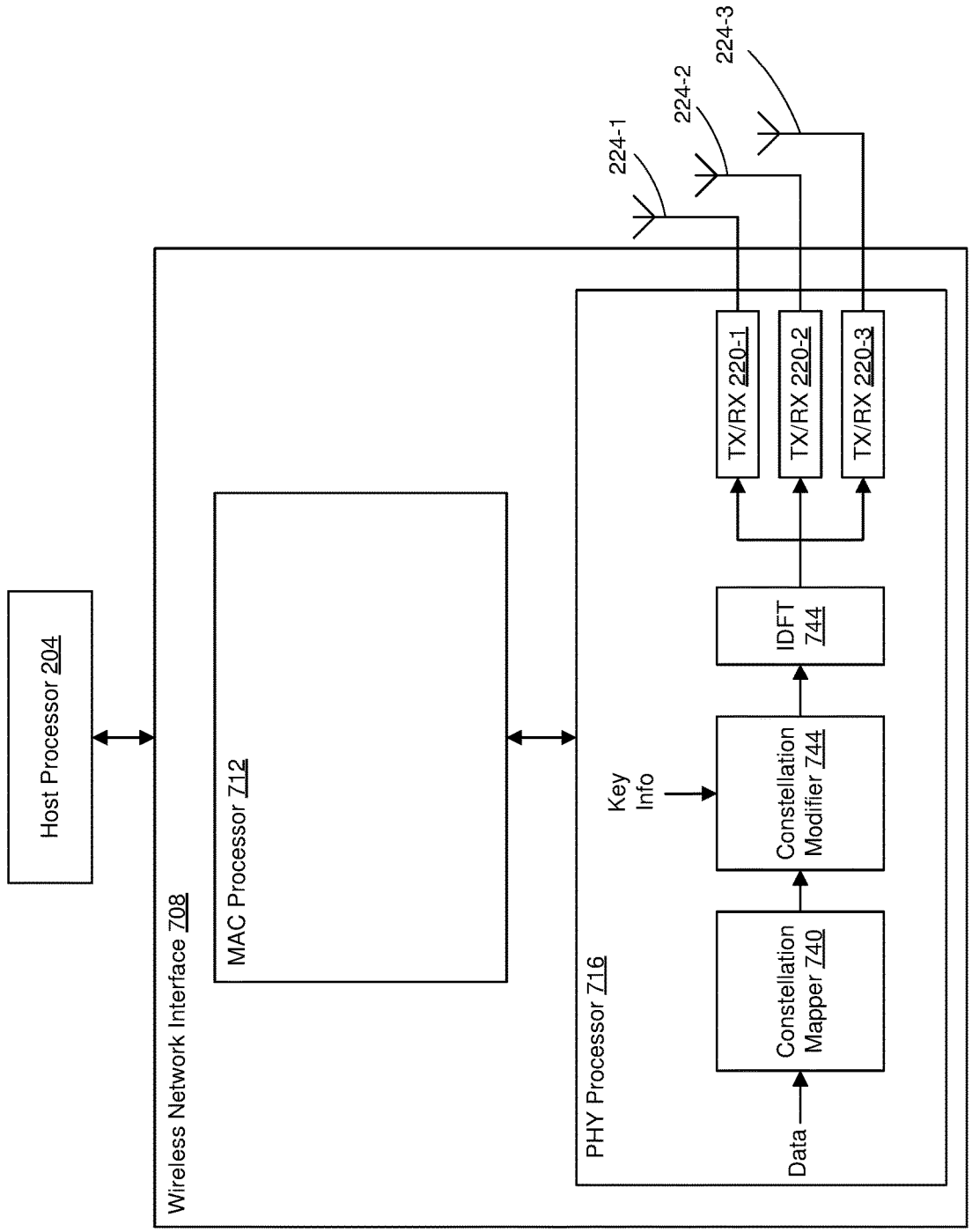
FIG. 7 is a diagram of another example access point, optionally used in the communication system of FIGS. 1A and 1B or in another suitable communication system, that is configured to use secure wireless communication techniques, according to another embodiment.

FIG. 7 is a diagram of an example AP 700 that is used as AP1 in FIGS. 1A and/or 1B, according to an embodiment. In some embodiments, AP2 and AP3 of FIGS. 1A and 1B have the same, or a similar, structure as the AP 700. The AP 700 is similar to the AP 200 of FIG. 2, and elements having a same reference number as in FIG. 2 are not described in detail for purposes of brevity.

The AP 700 comprises the host processor 204 coupled to a wireless network interface device 708. The wireless network interface device 708 includes one or more MAC processors 212 (sometimes referred to herein as "the MAC processor 712" for brevity) and one or more PHY processors 716 (sometimes referred to herein as "the PHY processor 716" for brevity).

The PHY processor 716 comprises a constellation mapper 740 that is configured to map information bits (among data that is to be transmitted to the client station 108) to respective transmission symbols (e.g., constellation points) corresponding to respective orthogonal frequency division (OFDM) subcarriers. The transmission symbols generated by the constellation mapper 740 are sometimes referred to herein as "unmodified transmission symbols".

The PHY processor 716 also comprises a constellation modifier 744 that is configured to modify the unmodified transmission symbols (e.g., unmodified constellation points) according to key information. For example, in an embodiment, the constellation modifier 744 is configured to generate pseudorandom transmission symbols (e.g., pseudorandom constellation points) in a predefined manner (e.g., according to a rule) using the key information, and then add the pseudorandom transmission symbols to the unmodified transmission symbols to generate modified transmission symbols (e.g., modified constellation points). When receiving a transmission from the AP 700 corresponding to the modified transmission symbols, the client station 108 knows the key information and the predefined manner (e.g., the rule) in which the pseudorandom transmission symbols were generated by the constellation modifier 744 and therefore can reverse the modifications made by the constellation modifier 744 prior to demodulating transmission symbols received by the client station 108. On the other hand, the modifications made by the constellation modifier 744 make it more difficult for an eavesdropper to decode the transmission from the AP 700.

In other embodiments, the constellation modifier 744 is configured to make other suitable pseudorandom modifications to the unmodified transmission symbols to generate modified transmission symbols, the pseudorandom modifications being determined in a predefined manner (e.g., according to a rule) using the key information. When receiving a transmission from the AP 700 corresponding to the modified transmission symbols, the client station 108 knows the key information and the predefined manner (e.g., the rule) in which the unmodified transmission symbols were modified by the constellation modifier 744, and therefore can reverse the modifications made by the constellation modifier 744 prior to demodulating transmission symbols received by the client station 108. On the other hand, the modifications made by the constellation modifier 744 make it more difficult for an eavesdropper to decode the transmission from the AP 700.

In an embodiment, the key information corresponds to channel estimate information. In another embodiment, the key information is generated using channel estimate information. In other embodiments, the key information corresponds to other suitable information, such as a channel quality metric, a randomly or pseudorandomly generated value that is exchanged between the AP 700 and the client station 108, etc.

The channel estimate information is determined by the AP 700 (e.g., the PHY processor 716) based on a previously received packet that was transmitted by the client station 108, according to an embodiment. For example, the packet that was transmitted by the client station 108 includes training signals that the AP 700 (e.g., the PHY processor 716) uses to generate the channel estimate information. The client station 108 will also determine, based on a packet that was transmitted by the AP 700, channel estimate information. Because of channel reciprocity, the channel estimate information determined by the client station 108 is substantially the same as the channel estimate information determined by the AP 700. Thus, in some embodiments in which the AP 700 uses key information that corresponds to, or is generated using, channel estimate information, the client station 108 is also aware of the key information.

In other embodiments, the channel estimate information is determined by the AP 700 (e.g., the PHY processor 716) by the AP 700 transmitting a packet having training signals (e.g., an NDP, a sounding packet, etc.) to the client station 108, and receiving channel estimate feedback from the client station 108, such as using techniques described above. Thus, in some embodiments in which the AP 700 uses key information that corresponds to, or is generated using, channel estimate information, the client station 108 is also aware of the key information.

In some embodiments, the AP 700 includes one or both of i) the secure transmission controller 132, the beamforming matrix calculator 240, and the beamforming network 244, and ii) the wired network interface device 260 of FIG. 2.

In some embodiments, a client station has a structure the same as or similar to the AP 700 of FIG. 7. In some embodiments, such a client station includes the secure transmission controller 140, the beamforming matrix calculator 340, and the beamforming network 344 of FIG. 3.

Figure 8:
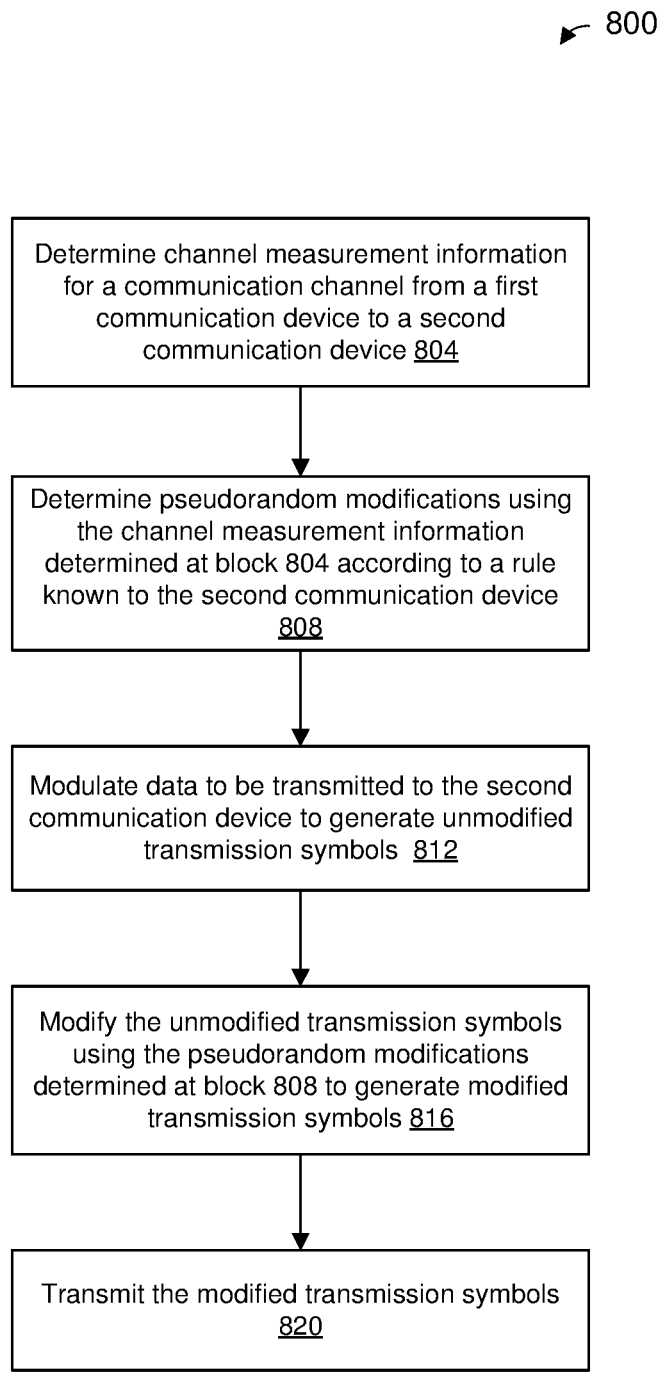
FIG. 8 is a flow diagram of another example method, e.g., implemented by the access point of FIG. 7 or another suitable communication device, for a first communication device to securely transmit data to a second communication device, according to another embodiment.

FIG. 8 is a flow diagram of an example method 800 for securely communicating in a wireless communication network, such as a WLAN, according to an embodiment. The method 800 optionally is used in conjunction with one or more of the methods/techniques described above, in some embodiments. In other embodiments, the method 800 is not used in conjunction with any of the methods/techniques described above.

The method 800 is implemented in the example communication system 100 of FIGS. 1A and 1B, in an embodiment, and the method 800 is described with reference to FIGS. 1A and 1B for explanatory purposes. For example, the method 800 is described with reference to a first communication and a second communication device, and in one scenario, the first communication device corresponds to AP1 and the second communication device corresponds to the client station 108. In another scenario, the first communication device corresponds to the client station 108 and the second communication device corresponds to AP1. In other embodiments, however, the method 800 is implemented in another suitable communication system different from the communication system 100.

In an embodiment, the wireless network interface device 708 (FIG. 7) is configured to implement the method 800. For example, the PHY processor 716 is configured to implement at least a portion of the method 800. The method 800 is described with reference to FIG. 7 for explanatory purposes. In other embodiments, however, the method 800 is implemented at least partially by another suitable communication device different from the wireless network interface device 708 (FIG. 7), such as by another suitable WLAN network interface device.

At block 804, a first communication device determines (e.g., the network interface 708 determines, the PHY processor 716 determines, etc.) channel measurement information for a wireless communication channel between the first communication device and a second communication device.

In an embodiment, determining channel measurement information at block 804 includes determining the channel measurement information for a communication channel. In an embodiment, channel measurements are determined based on a packet having training signals (e.g., a data packet with a PHY preamble having training signals, a control packet with a PHY preamble having training signals, a management packet with a PHY preamble having training signals, an NDP, a sounding packet, etc.) that was transmitted by the second communication device.

As will be discussed in more detail below, the first communication device uses the channel measurement information determined at block 804 to make pseudorandom modifications to transmission symbols that are then transmitted to the second communication, and thus the channel measurement information acts as a type of secret key. There are multiple ways for the second communication to become aware of the channel measurement information determined at block 804 (e.g., the secret key) that was used by the first communication device to make pseudorandom modifications to the transmission symbols. In one optional embodiment, the first communication device assumes that the second communication device is aware of the channel measurement information determined at block 804 because of channel reciprocity. For example, the second communication device will make channel measurements based on a packet received from the first communication device, and such channel measurements are assumed to be a reciprocal of the channel measurement information determined by the first communication device at block 804. In another optional embodiment, the method 800 further includes the first communication device transmitting to the second communication device channel estimation feedback corresponding to the channel measurement information determined at block 804 so that the second communication device is also aware of the channel measurement information determined at block 804.

In yet another embodiment, the method 800 further includes the first communication device transmitting to the second communication device a packet having training signals (e.g., an NDP, a sounding packet, etc.), and receiving channel estimation feedback from the second communication device; and determining channel measurement information at block 804 includes determining the channel measurement information using the channel estimation feedback from the second communication device.

At block 808, the first communication device determines (e.g., the network interface 708 determines, the PHY processor 716 determines, the constellation modifier 744 determines, etc.) pseudorandom modifications using the channel measurement information determined at block 804 according to a rule known to the second communication device. In an embodiment, determining the pseudorandom modifications at block 808 includes determining pseudorandom transmission symbols using the channel measurement information according to the rule. In another embodiment, determining the pseudorandom modifications at block 808 includes determining pseudorandom constellation points using the channel measurement information according to the rule.

At block 812, the first communication device modulates (e.g., the network interface 708 modulates, the PHY processor 716 modulates, the constellation mapper 740 modulates, etc.) data to be transmitted to the second communication device to generate unmodified transmission symbols.

In an embodiment, modulating the data at block 812 includes modulating the data to generate unmodified constellation points.

At block 816, the first communication device modifies (e.g., the network interface 708 modifies, the PHY processor 716 modifies, the constellation modifier 744 modifies, etc.) the unmodified transmission symbols generated at block 812 using the pseudorandom modifications generated at block 808 to generate modified transmission symbols. In an embodiment in which determining the pseudorandom modifications at block 808 includes determining pseudorandom transmission symbols, modifying the unmodified transmission symbols at block 816 includes adding the pseudorandom transmission symbols to the unmodified transmission symbols. In an embodiment in which determining the pseudorandom modifications at block 808 includes determining pseudorandom constellation points and in which modulating the data at block 812 includes generating unmodified constellation points, modifying the unmodified transmission symbols at block 816 includes adding the pseudorandom constellation points to the unmodified constellation points.

At block 820, the first communication device wirelessly transmits (e.g., the network interface 708 transmits, the PHY processor 716 transmits, the transceivers 220 transmit, etc.) the modified transmission symbols to the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for securely communicating in a wireless communication network, the method comprising:
    determining, at a first communication device, a first spatial direction for beamforming toward a second communication device;
    determining, at the first communication device, a second spatial direction that is orthogonal to the first spatial direction;
    wirelessly transmitting, by the first communication device, data to the second communication device while performing beamforming in the first spatial direction to transmit the data in the first spatial direction; and
    simultaneously with wirelessly transmitting the data to the second communication device, wirelessly transmitting, by the first communication device, noise and not the data while performing beamforming in the second spatial direction to transmit the noise and not the data in the second spatial direction.

2. The method of claim 1, further comprising:

coordinating, by the first communication device, with one or more third communication devices to prompt the one or more third communication devices to, simultaneously with the first communication device wirelessly transmitting the data to the second communication device, wirelessly transmit noise while performing beamforming in one or more respective third spatial directions that are orthogonal to one or more respective fourth spatial directions from the one or more respective third communication devices toward the second communication device, the one or more third communication devices wirelessly transmitting noise simultaneously with the first communication device wirelessly transmitting the data to the second communication device.

3. The method of claim 2, further comprising:

determining, at the one or more third communication devices, the one or more respective third spatial directions that are orthogonal to the one or more respective fourth spatial directions from the one or more respective third communication devices to the second communication device; and simultaneously with the first communication device wirelessly transmitting the data to the second communication device, wirelessly transmitting, by the one or more third communication devices, noise while performing beamforming in the one or more respective third spatial directions.

4. The method of claim 3, further comprising:

transmitting, by the one or more third communication devices, respective null data packets (NDPs) to the second communication device; and receiving, at the one or more third communication devices, respective channel estimation feedback from the second communication device, the respective channel estimation feedback corresponding to channel measurements made by the second communication device in connection with the second communication device receiving the respective NDPs;

wherein determining the one or more respective third spatial directions comprises using, at the one or more third communication devices, the respective channel estimation feedback for determining the respective third spatial directions.

5. The method of claim 2, further comprising:

coordinating, by the first communication device, with the one or more third communication devices to jointly transmit, by the first communication device and the one or more third communication devices, a null data packet (NDP) to the second communication device; and receiving, at the first communication device, first channel estimation feedback from the second communication device, the first channel estimation feedback corresponding to channel measurements made by the second communication device in connection with i) the second communication device receiving the NDP, and ii) a first wireless communication channel from the first communication device to the second communication device;

wherein determining the first direction for beamforming to the second communication device comprises using, at the first communication device, the first channel estimation feedback for determining the first spatial direction.

6. The method of claim 5, further comprising:

receiving, at the one or more third communication devices, respective second channel estimation feedback from the second communication device, the respective second channel estimation feedback corresponding to channel measurements made by the second communication device in connection with i) the second communication device receiving the NDP, and ii) one or more respective second wireless communication channels from the one or more third communication devices to the second communication device;

wherein determining the one or more respective third spatial directions comprises using, at the one or more third communication devices, the respective second channel feedback for determining the respective third spatial directions.

7. The method of claim 1, further comprising:

determining, at the first communication device, a signal to noise ratio (SNR) for the first direction to the second communication device; and determining, at the first communication device, a modulation and coding scheme (MCS) based on the SNR; and modulating and coding, at the first communication device, the data using the MCS.

8. The method of claim 1, further comprising:

transmitting, by the first communication device, a null data packet (NDP) to the second communication device; and receiving, at the first communication device, channel estimation feedback from the second communication device, the channel estimation feedback corresponding to channel measurements made by the second communication device in connection with the second communication device receiving the NDP;

wherein determining the first spatial direction for beamforming toward the second communication device comprises using, at the first communication device, the channel estimation feedback for determining the first spatial direction.

9. The method of claim 8, wherein determining the second spatial direction that is orthogonal to the first spatial direction comprises using, at the first communication device, the channel estimation feedback for determining the second spatial direction.

10. The method of claim 1, further comprising:

coordinating, by the first communication device, with one or more third communication devices so that the first communication device and the one or more third communication devices alternate sending data to the second communication device over time.

11. The method of claim 1, further comprising:

determining, at the first communication device, channel measurement information for a wireless communication channel between the first communication device and the second communication device;

determining, at the first communication device, pseudorandom modifications to be made to be made to transmission symbols using the channel measurement information according to a rule known to the second communication device;

modulating, at the first communication device, the data to be transmitted to the second communication device to generate unmodified transmission symbols; and modifying, at the first communication device, the unmodified transmission symbols using the pseudorandom modifications to generate modified transmission symbols;

wherein wirelessly transmitting the data to the second communication device while performing beamforming in the first spatial direction comprises wirelessly transmitting, by the first communication device, the modified transmission symbols to the second communication device.

12. The method of claim 11, wherein:

determining the pseudorandom modifications comprises determining, at the first communication device, pseudorandom transmission symbols using the channel measurement information according to the rule known to the second communication device; and modifying the unmodified transmission symbols using the pseudorandom modifications comprises adding the pseudorandom transmission symbols to the unmodified transmission symbols to generate the modified transmission symbols.

13. The method of claim 11, wherein:

modulating the data to be transmitted to the second communication device comprises generating unmodified constellation points; and modifying the unmodified transmission symbols using the pseudorandom modifications comprises using the pseudorandom modifications to generate modified constellation points.

14. The method of claim 13, wherein:

determining the pseudorandom modifications comprises determining, at the first communication device, pseudorandom constellation points using the channel measurement information according to the rule known to the second communication device; and modifying the unmodified constellation points using the pseudorandom modifications comprises adding the pseudorandom constellation points to the unmodified constellation points symbols to generate the modified constellation points.

15. The method of claim 11, further comprising:

transmitting, by the first communication device, a null data packet (NDP) to the second communication device;

wherein determining the channel measurement information comprises receiving, at the first communication device, channel estimation feedback from the second communication device, the channel estimation feedback corresponding to channel measurements made by the second communication device in connection with the second communication device receiving the NDP; and wherein determining the pseudorandom modifications comprises using, at the first communication device, the channel estimation feedback for determining the pseudorandom modifications.

16. The method of claim 11, further comprising:

receiving, by the first communication device, a packet from the second communication device, the packet including training signals;

wherein determining the channel measurement information comprises determining the channel measurement information based on receiving the packet from the second communication device.

17. The method of claim 16, further comprising:

transmitting, by the first communication device, channel estimation feedback to the second communication device, the channel estimation feedback including an indication of the channel measurement information determined by the first communication device.

18. A first communication device for securely communicating in a wireless communication network, the first communication device comprising:

a wireless network interface device comprising one or more integrated circuit (IC) devices configured to:
determine a first spatial direction for beamforming toward a second communication device,
determine a second spatial direction that is orthogonal to the first spatial direction,
wirelessly transmit data to the second communication device while performing beamforming in the first spatial direction to transmit the data in the first spatial direction, and
simultaneously with wirelessly transmitting the data to the second communication device, wirelessly transmit noise and not the data while performing beamforming in the second spatial direction to transmit the noise and not the data in the second spatial direction.

19. The first communication device of claim 18, wherein the one or more IC devices are further configured to:
coordinate with one or more third communication devices to prompt the one or more third communication devices to, simultaneously with the first communication device wirelessly transmitting the data to the second communication device, wirelessly transmit noise while performing beamforming in one or more respective third spatial directions that are orthogonal to one or more respective fourth spatial directions from the one or more respective third communication devices toward the second communication device, the one or more third communication devices wirelessly transmitting noise simultaneously with the first communication device wirelessly transmitting the data to the second communication device.

20. A system, comprising:

the first communication device of claim 19; and the one or more third communication devices, wherein the one or more third communication devices are configured to:
determine the one or more respective third spatial directions that are orthogonal to the one or more respective fourth spatial directions from the one or more respective third communication devices to the second communication device, and
simultaneously with the first communication device wirelessly transmitting the data to the second communication device, wirelessly transmit noise while performing beamforming in the one or more respective third spatial directions.

21. The system of claim 20, wherein the one or more third communication devices are further configured to:
transmit respective null data packets (NDPs) to the second communication device;
receive respective channel estimation feedback from the second communication device, the respective channel estimation feedback corresponding to channel measurements made by the second communication device in connection with the second communication device receiving the respective NDPs; and
use the respective channel estimation feedback for determining the respective third spatial directions.

22. The first communication device of claim 19, wherein the one or more IC devices are further configured to:

coordinate with the one or more third communication devices to jointly transmit, by the first communication device and the one or more third communication devices, a null data packet (NDP) to the second communication device;

receive first channel estimation feedback from the second communication device, the first channel estimation feedback corresponding to channel measurements made by the second communication device in connection with i) the second communication device receiving the NDP, and ii) a first wireless communication channel from the first communication device to the second communication device; and use the first channel estimation feedback for determining the first spatial direction.

23. The first communication device of claim 22, wherein the one or more IC devices are further configured to:

receive respective second channel estimation feedback from the second communication device, the respective second channel estimation feedback corresponding to channel measurements made by the second communication device in connection with i) the second communication device receiving the NDP, and ii) one or more respective second wireless communication channels from the one or more third communication devices to the second communication device; and use the respective second channel feedback for determining the respective third spatial directions.

24. The first communication device of claim 18, wherein the one or more IC devices are further configured to:

determine a signal to noise ratio (SNR) for the first direction to the second communication device; and determine a modulation and coding scheme (MCS) based on the SNR; and modulate and encode the data using the MCS.

25. The first communication device of claim 18, wherein the one or more IC devices are further configured to:

transmit a null data packet (NDP) to the second communication device;

receive channel estimation feedback from the second communication device, the channel estimation feedback corresponding to channel measurements made by the second communication device in connection with the second communication device receiving the NDP; and use the channel estimation feedback for determining the first spatial direction.

26. The first communication device of claim 25, wherein the one or more IC devices are further configured to:

use the channel estimation feedback for determining the second spatial direction.

27. The first communication device of claim 18, wherein the one or more IC devices are further configured to:

coordinate with one or more third communication devices so that the first communication device and the one or more third communication devices alternate sending data to the second communication device over time.

28. The first communication device of claim 18, wherein the one or more IC devices are further configured to:

determine channel measurement information for a wireless communication channel between the first communication device and a second communication device, determine pseudorandom modifications to be made to be made to transmission symbols using the channel measurement information according to a rule known to the second communication device, modulate the data to be transmitted to the second communication device to generate unmodified transmission symbols, modify the unmodified transmission symbols using the pseudorandom modifications to generate modified transmission symbols, and wirelessly transmit the modified transmission symbols to the second communication device as part of wirelessly transmitting the data to the second communication device while performing beamforming in the first spatial direction.

29. The first communication device of claim 28, wherein the one or more IC devices are further configured to:

determine pseudorandom transmission symbols using the channel measurement information according to the rule known to the second communication device; and add the pseudorandom transmission symbols to the unmodified transmission symbols to generate the modified transmission symbols.

30. The first communication device of claim 28, wherein the one or more IC devices are further configured to:

modulating the data to be transmitted to the second communication device to generate unmodified constellation points; and use the pseudorandom modifications to generate modified constellation points.

31. The first communication device of claim 30, wherein the one or more IC devices are further configured to:

determine pseudorandom constellation points using the channel measurement information according to the rule known to the second communication device; and add the pseudorandom constellation points to the unmodified constellation points symbols to generate the modified constellation points.

32. The first communication device of claim 28, wherein the one or more IC devices are further configured to:

transmit a null data packet (NDP) to the second communication device;

receive channel estimation feedback from the second communication device, the channel estimation feedback corresponding to channel measurements made by the second communication device in connection with the second communication device receiving the NDP; and use the channel estimation feedback for determining the pseudorandom modifications.

33. The first communication device of claim 28, wherein the one or more IC devices are further configured to:

receive a packet from the second communication device, the packet including training signals; and determine the channel measurement information based on receiving the packet from the second communication device.

34. The first communication device of claim 33, wherein the one or more IC devices are further configured to:

transmit channel estimation feedback to the second communication device, the channel estimation feedback including an indication of the channel measurement information determined by the first communication device.

* * * * *